(12) United States Patent
Amorai-Moriya et al.

(10) Patent No.: US 6,316,934 B1
(45) Date of Patent: Nov. 13, 2001

(54) SYSTEM FOR THREE DIMENSIONAL POSITIONING AND TRACKING

(75) Inventors: Netzer Amorai-Moriya, Ramat Hasharon; Mordechai Itzkovich; Boaz Spivak, both of Petach Tikva, all of (IL)

(73) Assignee: Netmor Ltd., Ramat Hasharon (IL)

( * ) Notice: Subject to any disclaimer, the term of this patent is extended or adjusted under 35 U.S.C. 154(b) by 0 days.

(21) Appl. No.: 09/345,189

(22) Filed: Jun. 30, 1999

(30) Foreign Application Priority Data

Sep. 17, 1998 (IL) ........................................................ 126284

(51) Int. Cl.$^7$ ................................. G01B 7/14; G01S 5/04
(52) U.S. Cl. .................... 324/207.17; 342/152; 342/153; 702/153
(58) Field of Search ........................ 324/207.17, 207.16, 324/207.23; 702/152, 153; 342/451, 463

(56) References Cited

U.S. PATENT DOCUMENTS

| | | | |
|---|---|---|---|
| 4,017,858 | 4/1977 | Kuipers | 342/350 |
| 4,054,881 | 10/1977 | Raab | 342/448 |
| 4,298,874 | * 11/1981 | Kuipers | 343/112 |
| 4,314,251 | 2/1982 | Raab | 342/463 |
| 4,613,866 | 9/1986 | Blood | 342/448 |
| 4,622,644 | 11/1986 | Hansen | 702/153 |
| 4,710,708 | 12/1987 | Rorden et al. | 324/207.26 |
| 4,737,794 | 4/1988 | Jones | 342/448 |
| 4,742,356 | 5/1988 | Kuipers | 342/448 |
| 4,849,692 | 7/1989 | Blood | 324/207.26 |
| 4,945,305 | 7/1990 | Blood | 324/207.17 |
| 5,168,222 | 12/1992 | Volsin et al. | 324/207.17 |
| 5,170,172 | 12/1992 | Weinstein | 342/458 |
| 5,453,686 | 9/1995 | Anderson | 324/207.17 |
| 5,467,273 | 11/1995 | Faibis et al. | 701/23 |

FOREIGN PATENT DOCUMENTS

WO 94/04938    3/1994    (WO).

OTHER PUBLICATIONS

D. E. Goldberg, "Genetic Algorithms in Search, Optimization & Machine Learning", Addison Wesley Longman Inc., Chapter 2, pp. 27–57, 1989.
M. Mitchell, "An Introduction to Genetic Algorithms", The MIT Press, Chapter 1, pp. 1–33, 1996.
R. E. Best, "Phase–Locked Loops: Design, Simulation and Applications", Third Edition, Mc–Graw–Hill, Chapter 4, pp. 177–228, 1997.
J. D. Jackson, "Classical Electrodynamics", John Wiley & Sons, 2nd Edition, Chapter 5, pp. 168–208, 1975.
N. S. Jayant and P. Noll, "Digital Coding of Waveforms: Principles and Applications to Speech and Video", Prentice–Hall Inc, Chapter 3, pp. 86–114, 1984.
J. Klapper and J. T. Frankle, "Phase–Locked and Frequency–Feedback Systems: principles and techniques", Academic Press Inc., Chapter 3, pp. 23–48, 1972.

* cited by examiner

*Primary Examiner*—Jay Patidar
(74) *Attorney, Agent, or Firm*—Townsend and Townsend and Crew LLP

(57) ABSTRACT

A system for monitoring of the position of at least one portion of an object. The system includes a plurality of transmitters operative to transmit alternating magnetic fields within a three-dimensional space, and at least one positioning sensor arranged to be fixed to at least one corresponding portion of the object whose position it is sought to monitor. Each of the positioning sensors includes a magnetic field receiver having at least one active axis and operative to receive at least one component, lying along the at least one active axes respectively, of the alternating magnetic fields. Each of the positioning sensors also includes at least one digital signal processor for storing at least one characteristic of the magnetic fields as transmitted by the plurality of transmitters, and comparing the characteristic to at least one characteristic of the magnetic fields as received by at least a corresponding one of the positioning sensors and, accordingly, determining and providing an output indication of at least one position characteristic of at least one corresponding portion of the object.

36 Claims, 17 Drawing Sheets

SYSTEM FOR THREE DIMENSIONAL POSITIONING AND TRACKING

FIELD OF THE INVENTION

The present invention relates generally, to positioning systems and more particularly to positioning systems employing alternating electromagnetic fields.

BACKGROUND OF THE INVENTION

Various types of positioning systems which employ alternating electromagnetic fields are known. The following U.S. Patents and foreign patent documents are believed to represent the state of the art:

U.S. Pat. Nos. 4,054,881 and 4,314,251 to Raab; 4,622,644 to Hansen; 4,737,794 to Jones; 4,613,866, 4,945,305 and 4,849,692 to Blood, 4,017,858 and 4,298,874 and 4,742,356 to Kuipers; 5,168,222 to Volsin et al; 5,0170,172 to Weinstein; and 5,453,686 to Anderson; WO 94/04938 to Bladen.

U.S. Pat. No. 4,710,708 to Rorden describes a positioning system which employs only one magnetic coil.

Genetic algorithms are described in *Genetic algorithms in search: optimization and machine learning,* D. Goldberg, 1989; and

*An introduction to genetic algorithms,* Melanie Mitchell, 1996.

PLL technology is described in *Phase locked loop: simulation and applications,* by Roland E. Best, McGraw-Hill Book Company, ISBN 0070060517.

The disclosures of all publications mentioned in the specification and of the publications cited therein are hereby incorporated by reference.

SUMMARY OF THE INVENTION

The present invention provides improved apparatus and method for positioning and tracking objects. A block diagram of the disclosed system is shown in FIG. 1d. In accordance with a preferred embodiment of the present invention a system comprises of N transmitters, where $N \geq 6$, and at least one probe sensor which detects at least 6 electromagnetic signals, each characterized by its own frequency. The probe sensor typically comprises a single magnetic field detector that is connected to a digital signal processing circuit. The analog output of the magnetic signal detector is a voltage signal proportional to the superposition of the N magnetic field transmitters at the coordinates $x^i$, $y^i$, $z^i$, $\theta^i$, $\varphi^i$, where the index i denote the position of the magnetic coil i. It is a particular feature of a preferred embodiment of the present invention that the antenna coils need not be exactly mutually orthogonal and certainly need not be arranged such that the centers of the antenna coils coincide.

The analog signal is digitized and is introduced to an integrated digital signal processor block, as an input data. The digitized input data from the of the magnetic detector is then used by the digital signal processor unit to compute the position and orientation coordinates of the magnetic detector. The output from the digital signal processor unit is then transferred to the Data Communication unit and then to the System Control Unit. The refresh rate of the output data is typically of the order of few times per second to a few hundred times per second.

The detector may comprise a one-axis antenna coil, as illustrated in FIG. 2, or may alternatively comprise any other suitable type of one-axis magnetic field detector, such as a Hall-effect detector or a solid state component e.g. a magneto-resistive detector or a magneto-diode or a magneto-transistor. The digital signal processor unit typically comprises three modules: a tracking and control module, an envelope detector module and a position determination unit. The tracking and control subsystem is operative to increase the precision of the position determinations by decreasing the dynamic range of the input signal to the A/D converter.

The output of the tracking and control module is supplied to an envelope detector, which is operative to determine the received envelope amplitudes (magnitude and sign) $C^1, \ldots, C^N$ of the N magnetic signals received from the N RF transmitters. The tracking and control subsystem preferably comprises an Linear Predictive Coding (LPC) module. The envelope detector module typically comprises of N identical envelope detectors (EDs) working in parallel. Optionally, each of the ED modules comprises two sub-modules: a Phase Lock Loop (hereafter PLL), and a System Synchronization Unit, which is called during the operation of the ED module to define the absolute sign of the signal amplitude. Alternatively, each ED module comprises three sub-modules operating in parallel and another sub-module that is called when a system synchronization is needed. The three modules are: a Phase Lock Loop (hereafter PLL), a Non-coherent absolute value envelope-detector, and a Sign Detection Unit. A fourth sub-module, System synchronization unit, is then called to define the absolute sign of the signal amplitude.

The output of the envelope detector is supplied to the position determination unit which is operative, based on the signed amplitude values supplied by the envelope detector, to provide an output indication of the position of the magnetic field detector in the sensor.

The operation of the position determination unit is typically based on solving N analytic equations with 6 unknowns.

A genetic algorithm method is typically employed for solving the position equation to obtain the position and orientation of the detector.

There is thus provided in accordance with a preferred embodiment of the present invention a system for monitoring of the position of at least one portions of an object, the system including a plurality of transmitters operative to transmit alternating magnetic fields within a three-dimensional space, and at least one positioning sensors arranged to be fixed to at least one corresponding portions of the object whose positions it is sought to monitor, each of the at least one positioning sensors including a magnetic field receiver having at least one active axes and operative to receive at least one component, lying along the at least one active axes respectively, of the alternating magnetic fields, and at least one digital signal processors for storing at least one characteristic of the magnetic fields as transmitted by the plurality of transmitters and comparing the at least one characteristic to at least one characteristic of the magnetic fields as received by at least a corresponding one of the at least one positioning sensors and, accordingly, determining and providing an output indication of at least one position characteristic of at least one corresponding portions of the object.

Further in accordance with a preferred embodiment of the present invention the at least one sensors comprise a single sensor arranged to be fixed to a single portion of the object whose position it is sought to monitor.

Still further in accordance with a preferred embodiment of the present invention the at least one position characteristic comprises at least one dimension of the spatial position of the object portion. Preferably the at least one position characteristic also includes at least one dimension of the angular position of the object portion.

Additionally in accordance with a preferred embodiment of the present invention the at least one sensors comprise a plurality of sensors arranged to be fixed to a corresponding plurality of portions of the object whose positions it is sought to monitor.

Moreover in accordance with a preferred embodiment of the present invention the magnetic field receiver has a single (detection) active axis and is operative to receive the component of the alternating magnetic fields lying along the single (detection) active axis.

Preferably the plurality of transmitters are operative to continuously transmit said alternating magnetic fields.

There is also provided in accordance with another preferred embodiment of the present invention a system for monitoring the position of at least one portions of an object in three-dimensional space having three axes, the system including at least six magnetic transmitters each having a center and each operative to transmit alternating magnetic fields within a three-dimensional space, a transmitter orientation maintainer operative to maintain at least three of the transmitters in orientations such that at least a component of the magnetic field of at least one of the transmitters falls within each of the 3 axes of the 3-dimensional space, and wherein less than all of the centers of the transmitters coincide, at least one positioning sensors arranged to be fixed to at least one corresponding portions of the object whose positions it is sought to monitor, each of the at least one positioning sensors comprising a magnetic field receiver receiving the alternating magnetic fields from the at least six transmitters, and at least one digital signal processor for storing at least one characteristic of the magnetic fields as transmitted by the plurality of at least six transmitters and comparing the at least one characteristic to at least one characteristic of the magnetic fields as received by at least a corresponding one of the at least one positioning sensors and, accordingly, determining at least one position characteristic of at least one object portion.

Further in accordance with a preferred embodiment of the present invention the at least one digital signal processor is provided integrally with a corresponding one of the at least one positioning sensors.

Additionally in accordance with a preferred embodiment of the present invention at least 3 of the transmitters are separate physical units such that the at least three transmitters can be positioned at any 3 user-selected locations.

There is also provided in accordance with yet another preferred embodiment of the present invention a system for monitoring the position of at least one portions of an object in three-dimensional space having three axes, the system including at least six magnetic transmitters each having an active axial direction and each operative to transmit alternating magnetic fields within a three-dimensional space, a transmitter orientation maintainer operative to maintain at least three of the transmitters in orientations such that at least a component of the magnetic field of at least one of the transmitters falls within each of the 3 axes of the 3-dimensional space, and wherein less than all of the transmitters' active axial directions are mutually orthogonal, at least one positioning sensors arranged to be fixed to at least one corresponding portions of the object whose positions it is sought to monitor, each of said at least one positioning sensors comprising a magnetic field receiver receiving said alternating magnetic fields from the at least six transmitters, and at least one digital signal processor for storing at least one characteristic of the magnetic fields as transmitted by the plurality of at least six transmitters and comparing said at least one characteristic to at least one characteristic of the magnetic fields as received by at least a corresponding one of the at least one positioning sensors and, accordingly, determining at least one position characteristic of at least one object portion.

Further in accordance with a preferred embodiment of the present invention at least first and second transmitters from among the at least six transmitters transmit in different frequencies.

Preferably at least first and second transmitters from among the at least six transmitters transmit in different phases.

Additionally in accordance with a preferred embodiment of the present invention at least one of the at least one digital signal processors is operative to simultaneously process magnetic field characteristics arriving from more than one of the at least six transmitters.

Still further in accordance with a preferred embodiment of the present invention and also comprising an RF trigger which is operative to trigger all of the transmitters, thereby to synchronize the transmitters. Additionally or alternatively the RF trigger provides a timing signal to at least one of the at least one sensors. Preferably at least one of the sensors computes the absolute phase of the at least six transmitters, based on said timing signal.

There is also provided in accordance with a preferred embodiment of the present invention a method for monitoring of the position of at least one portions of an object, the method including affixing at least one positioning sensors to at least one corresponding portions of the object whose positions it is sought to monitor, the sensors being operative to receive alternating magnetic fields existing within a three dimensional space containing the object, comparing at least one characteristic of the magnetic fields as transmitted to at least one characteristic of the magnetic fields as received by the sensors, and using a result of the comparing step as an input to a genetic natural selection process for determining and providing an output indication of at least one position characteristic of at least one corresponding portions of the object.

Further in accordance with a preferred embodiment of the present invention at least one of the sensors comprises a Linear Predicted Coding control loop operative to increase the dynamic range of incoming signals. Preferably at least one of the sensors comprises a solid-state component. Additionally or alternatively at least one of the sensors comprises a control loop to improve the dynamic range of the signal intensity without the use of electronic components common in the art.

Further in accordance with a preferred embodiment of the present invention, at least one of the sensors comprises a PLL configuration whose output is relatively insensitive to its input amplitude.

Still further in accordance with a preferred embodiment of the present invention, at least one dynamic property of the PLL apparatus does not substantially depend on the input amplitude of the PLL apparatus.

Still further in accordance with a preferred embodiment of the present invention, the bandwidth of the PLL apparatus does not substantially depend on the input amplitude of the PLL apparatus.

Additionally in accordance with a preferred embodiment of the present invention, the relaxation time constant of the PLL apparatus does not substantially depend on the input amplitude of the PLL apparatus.

The dynamic properties of the PLL, specifically bandwidth, and its relaxation time constant typically do not depend on the input amplitude.

There is also provided in accordance with a preferred embodiment of the present invention a method for monitoring of the position of at least one portions of an object, the method including positioning a plurality of transmitters operative to transmit alternating magnetic fields within a three-dimensional space and affixing at least one positioning sensors arranged to be fixed to at least one corresponding portions of the object whose positions it is sought to monitor, each of the at least one positioning sensors comprising a magnetic field receiver having at least one active axes and operative to receive at least one component, lying along the at least one active axes respectively, of the alternating magnetic fields and storing at least one characteristic of the magnetic fields as transmitted by the plurality of transmitters and comparing the at least one characteristic to at least one characteristic of the magnetic fields as received by at least a corresponding one of the at least one positioning sensors and, accordingly, determining and providing an output indication of at least one position characteristic of at least one corresponding portions of the object, wherein the storing, comparing, determining and providing step is performed locally rather than remotely.

There is also provided in accordance with yet another preferred embodiment of the present invention a method for monitoring the position of at least one portions of an object in three-dimensional space having three axes, the method including positioning at least six magnetic transmitters each having a center and each operative to transmit alternating magnetic fields within a three-dimensional space, including maintaining at least three of the transmitters in orientations such that at least a component of the magnetic field of at least one of the transmitters falls within each of the 3 axes of the 3-dimensional space, and wherein less than all of the centers of the transmitters coincide, affixing at least one positioning sensor to at least one corresponding portions of the object whose positions it is sought to monitor, each of the at least one positioning sensors comprising a magnetic field receiver receiving said alternating magnetic fields from the at least six transmitters, and storing at least one characteristic of the magnetic fields as transmitted by the plurality of at least six transmitters and comparing the at least one characteristic to at least one characteristic of the magnetic fields as received by at least a corresponding one of the at least one positioning sensors and, accordingly, determining at least one position characteristic of at least one object portion.

There is also provided in accordance with another preferred embodiment of the present invention a method for monitoring the position of at least one portions of an object in three-dimensional space having three axes, the method including positioning at least six magnetic transmitters each having an active axial direction and each operative to transmit alternating magnetic fields within a three-dimensional space, including maintaining at least three of the transmitters in orientations such that at least a component of the magnetic field of at least one of the transmitters falls within each of the 3 axes of the 3-dimensional space, and wherein less than all of the transmitters' active axial directions are mutually orthogonal, affixing at least one positioning sensors arranged to be fixed to at least one corresponding portions of the object whose positions it is sought to monitor, each of said at least one positioning sensors comprising a magnetic field receiver receiving the alternating magnetic fields from the at least six transmitters, and storing at least one characteristic of the magnetic fields as transmitted by the plurality of at least six transmitters and comparing said at least one characteristic to at least one characteristic of the magnetic fields as received by at least a corresponding one of the at least one positioning sensors and, accordingly, determining at least one position characteristic of at least one object portion.

BRIEF DESCRIPTION OF THE DRAWINGS AND APPENDICES

The present invention will be understood and appreciated more fully from the following detailed description, taken in conjunction with the drawings and appendices in which:

FIG. 1b is a virtual reality application of the system of FIG. 1a in which a simulation system receives the position outputs generated by the system of FIG. 1a and generates a display image including a computer-generated scene and a figure having body part motion which mimics the body part motion of the human user of FIG. 1a as detected by the positioning system of FIG. 1a;

FIG. 1d is a simplified functional block diagram illustration of the apparatus of FIG. 1a;

FIG. 7b is a simplified flowchart illustration of a preferred method for performing the coordinate possibility evaluation step of FIG. 7a;

FIG. 7c is a simplified flowchart illustration of a preferred method for performing the new generation creation step of FIG. 7a;

Figure 8:
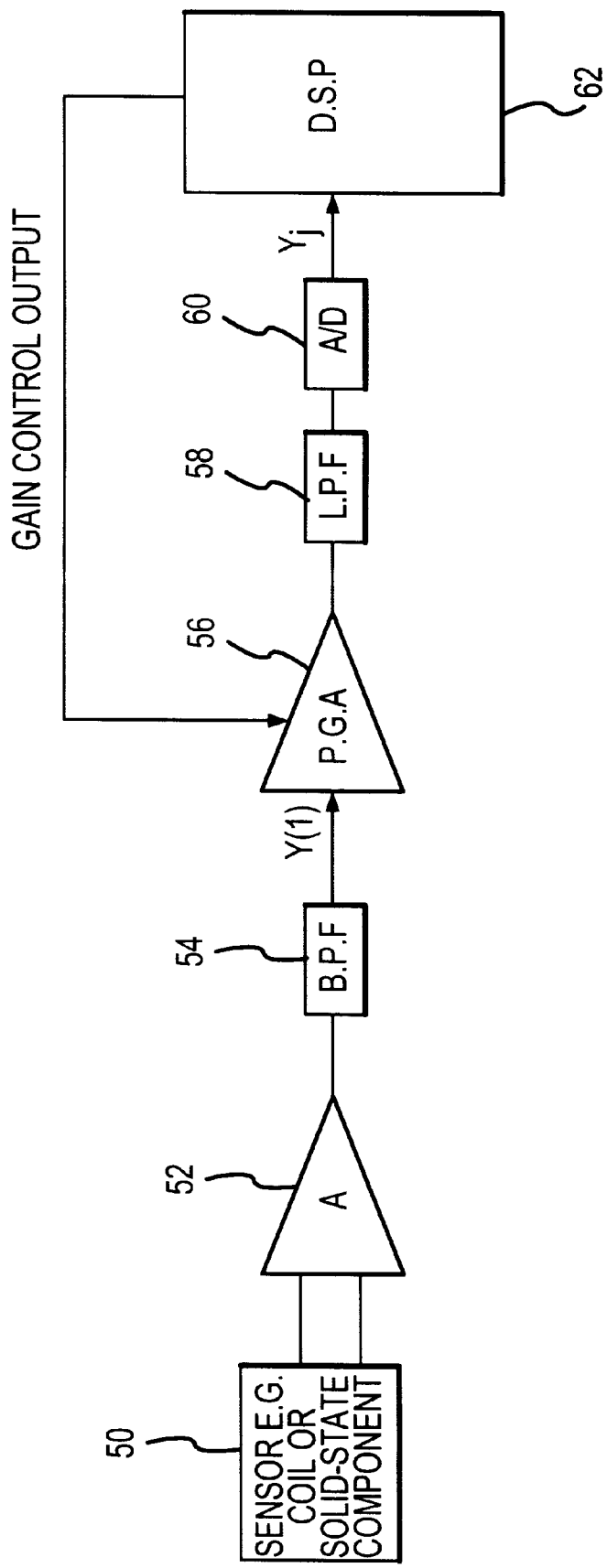
FIG. 8 is a simplified block diagram illustrations of a second preferred embodiment of an individual one of the positioning sensors of FIGS. 1a–c.

Appendix A is a computer code listing of a preferred software implementation of the digital signal processing unit of FIG. 8.

DETAILED DESCRIPTION OF PREFERRED EMBODIMENTS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

The term "spatial position" is employed herein to refer to the location of a detector or other object within a three-dimensional space which may, for example, be expressed in Cartesian coordinates (x, y, z) or alternatively may be expressed in any other suitable coordinate system such as a polar system.

The term "angular position" is employed herein to refer to an orientation of the detector or other object relative to the three-dimensional space which may, for example, be expressed as (θ, φ) where the designation of φ must also include the quadrant in which the angle φ is located. The orientation may, of course, also be expressed in other suitable coordinates such as Euler coordinates or such as yaw, pitch and roll.

The term "RF transmitter" is employed herein to refer to a transmitter transmitting at a frequency of 5 KHz and upwards and preferably at a frequency of 10–100 KHz. According to one embodiment of the present invention, the transmissions are pulse transmissions. However, preferably, the transmission are continuous rather than pulse transmissions.

The term "magnetic field" is intended to include electromagnetic fields as well as magnetic fields.

The analog signal is digitized and is introduced to an integrated digital signal processor block 62, as an input data. The digitized input data from the magnetic detector 50 is then used by the digital signal processor unit 62 to calculate the position and orientation coordinates of the magnetic detector 50. The output from the digital signal processor unit 62 is then transferred to the Data Communication unit 51 and then to the System Control Unit 30. The refresh rate of the output data is of the order of few times per second to a few hundred times per second.

Figure 2:
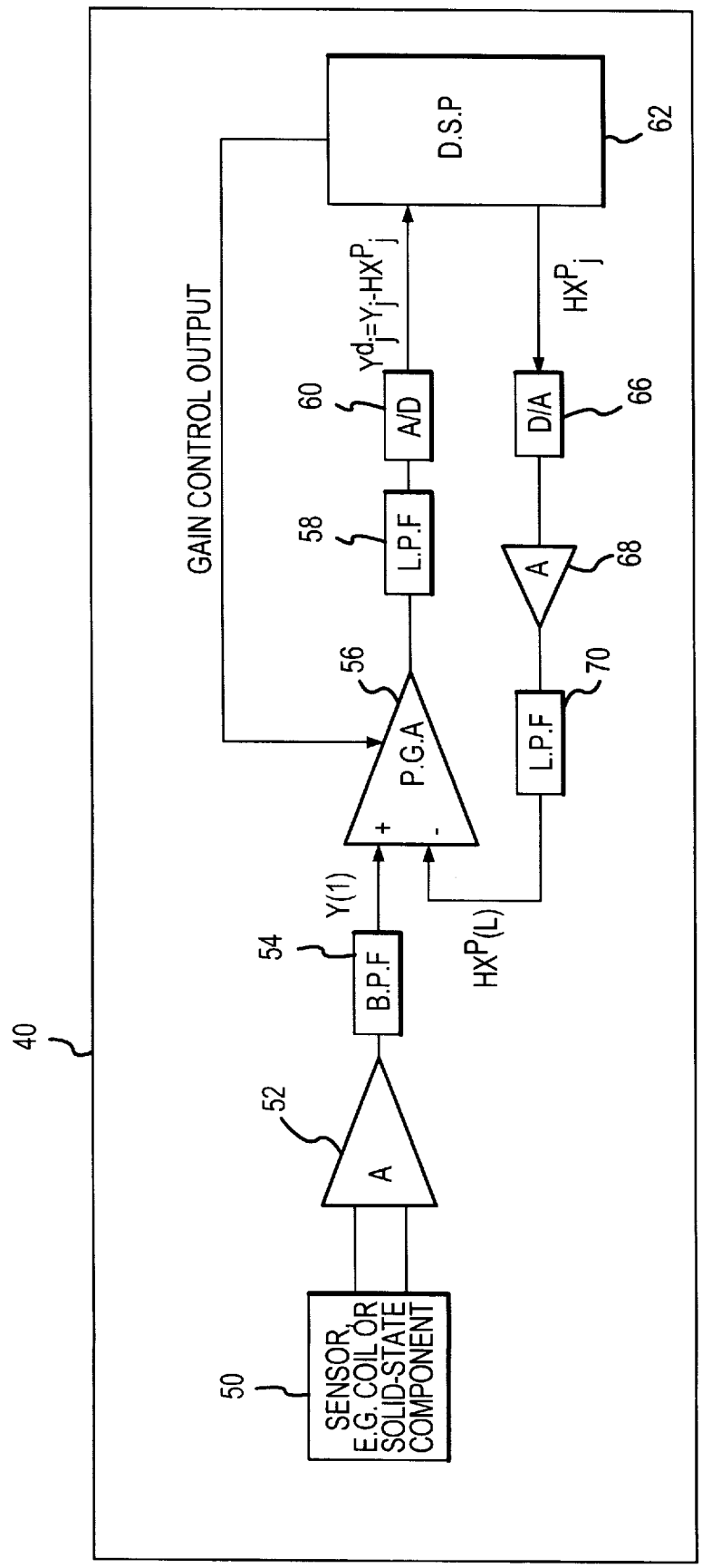
FIG. 2 is a simplified block diagram illustration of a first preferred embodiment of an individual one of the positioning sensors of FIG. 1.
Figure 3:
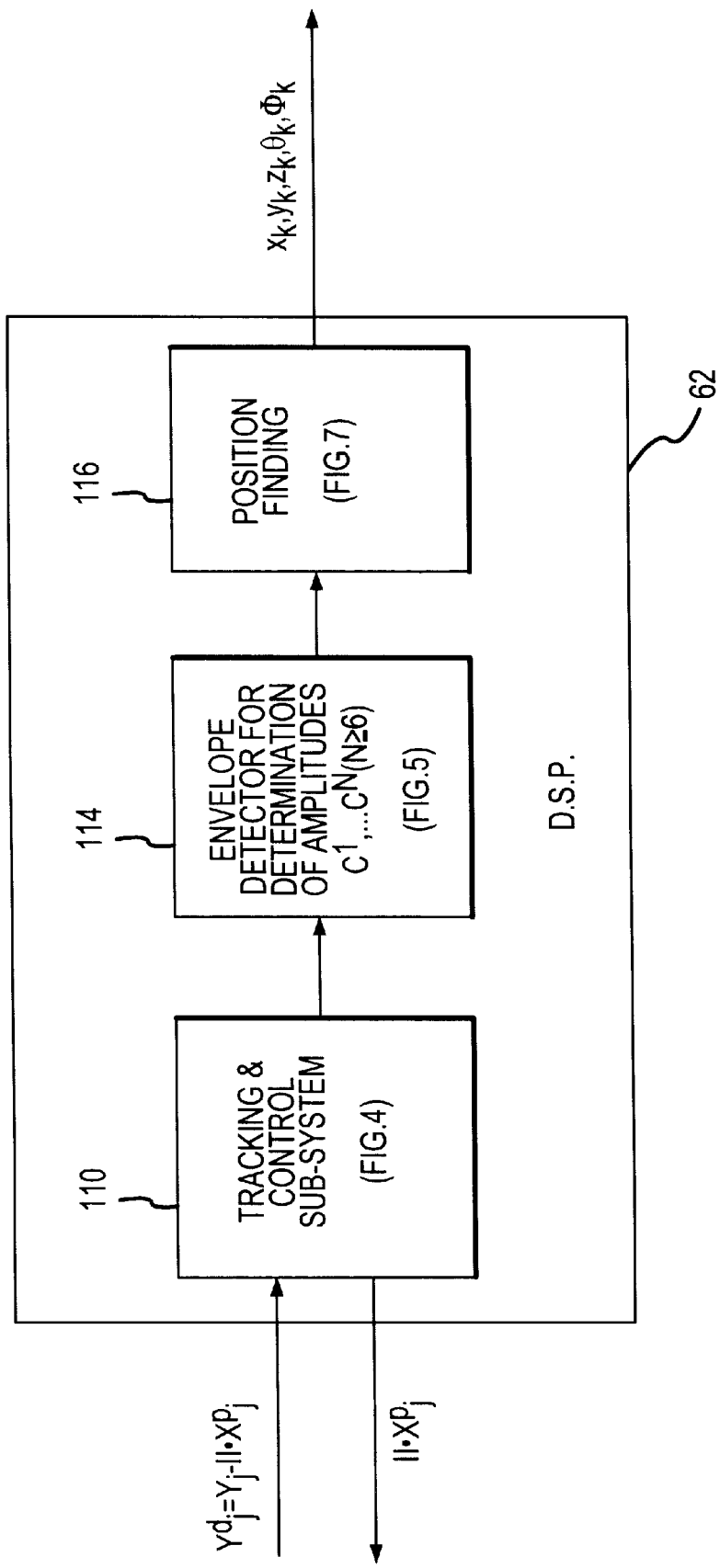
FIG. 3 is a simplified block diagram illustration of a first preferred digital signal processing unit useful in the sensor of FIG. 2.

Detector 50 may comprise a one-axis antenna coil, as illustrated in FIG. 2, or may alternatively comprise any other suitable type of one-axis magnetic field detector, such as a Hall-effect detector or a solid state component e.g. a magneto-resistive detector or a magneto-diode or a magneto-transistor. The digital signal processor unit 62 comprises three modules: a tracking and control module 110, an envelop detector module 114 and a position determination unit 116 (FIG. 3). The tracking and control subsystem 110 is operative to increase the precision of the position determinations by decreasing the dynamic range of the input signal to the A/D converter.

The output of block 110 is supplied to an envelope detector 114, which is operative to determine the received envelope amplitudes (magnitude and sign) $C^1, \ldots, C^N$ of the N magnetic signals received from the N RF transmitters. The tracking and control subsystem 110 of FIG. 4 preferably comprises a Linear Predictive Coding (LPC) module. Block 114 is described schematically in FIG. 5. and comprises of N identical envelope detectors (ED's) working in parallel. One of the ED's is described schematically in two variations. The first configuration is shown in FIG. 6a, where each of the ED modules comprises two sub-modules: a Phase Lock Loop (hereafter PLL) 132, described in detail below with reference to FIG. 6b and a System Synchronization Unit 420, which is called during the operation of the ED module to define the absolute sign of the signal amplitude. An alternative configuration of an ED module is described in FIG. 6c. In this configuration, each ED module comprises three sub-modules operating in parallel and another sub-module that is called when a system synchronization is needed (see below). The three modules are: a Phase Lock Loop 132 (hereafter PLL), a Non-coherent absolute value envelope-detector 133, and a Sign Detection Unit 415. The fourth sub-module, a System synchronization unit 420, is then called to define the absolute sign of the signal amplitude.

The output of the envelope detector 114 is supplied to the position determination unit 116. Unit 116 is operative, based on the signed amplitude values supplied by unit 114, to provide an output indication of the position of the magnetic field detector 50 in sensor 40.

The position determination of module 116 is based on solving N analytic equations with 6 unknowns.

A genetic algorithm method is implied for solving the position equation to obtain the position and orientation of the detector 50, described in detail below with reference to FIGS. 7 and 8.

Figure 1A:
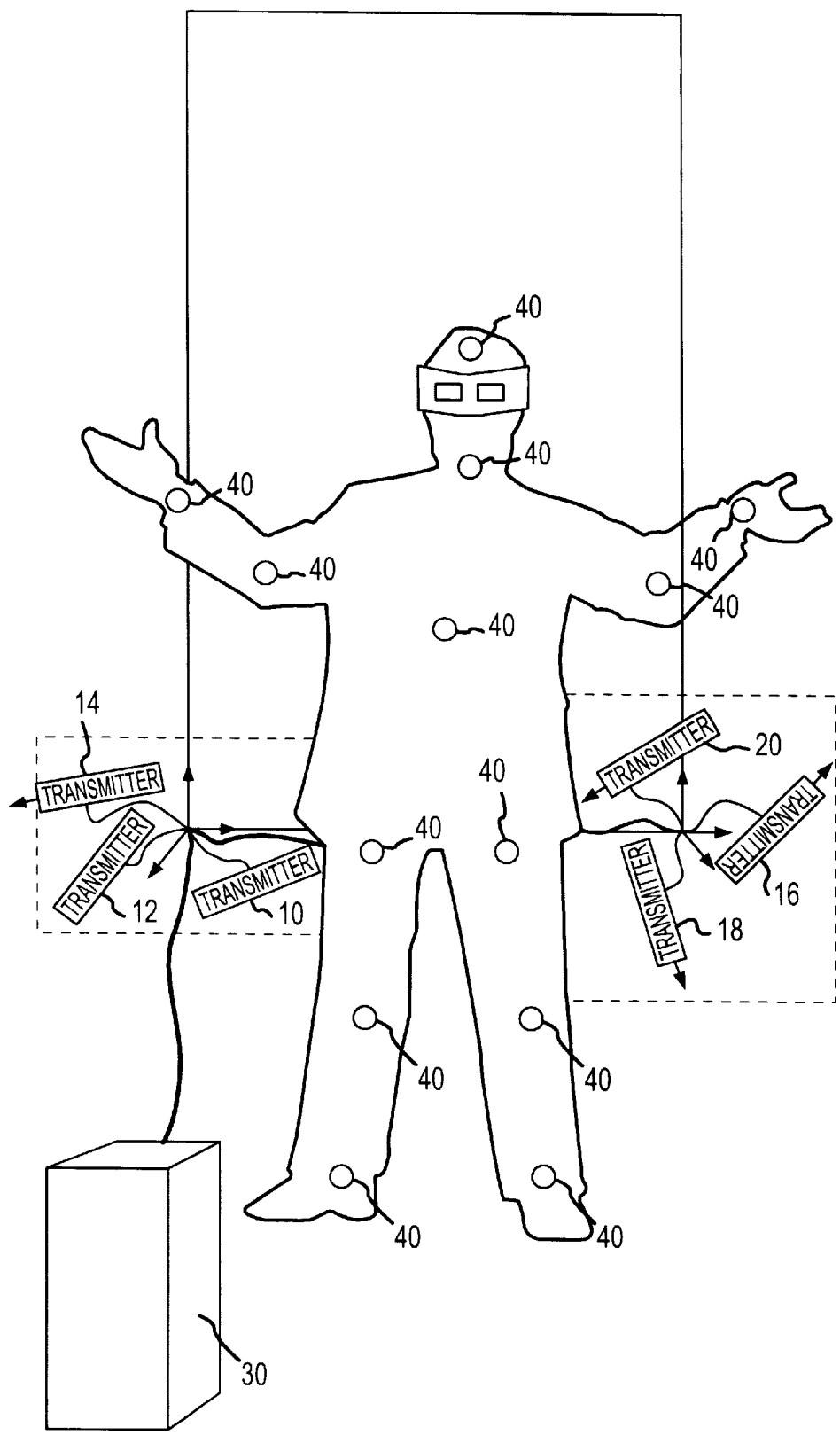
FIG. 1a is a simplified pictorial illustration of a positioning system constructed and operative in accordance with a preferred embodiment of the present invention which outputs the position of an object as a whole or parts thereof, such as, in the illustrated embodiment, body parts of a human user.

Reference is now made to FIG. 1a, which is a simplified pictorial illustration of a positioning system constructed and operative in accordance with a preferred embodiment of the present invention. The system of FIG. 1a preferably outputs the spatial and/or angular position of an object, such as a human user, as a whole or of parts thereof, such as, in the illustrated embodiment, body parts of the human user.

The positioning system of FIG. 1a comprises N>=6 (at least 6) RF transmitters 10, 12, 14, 16, 18 and 20, each of which preferably comprises a mutually non-parallel antenna coil. Each transmitter defines an active axial direction, e.g. the axis of the coil if the transmitter comprises a coil.

The six (in the illustrated embodiment) antenna coils each transmit at a different frequency f1, ..., f6 respectively and each produce a magnetic field. The coils are preferably arranged such that, for each of the three orthogonal axes, there exists at least two antenna coils whose magnetic fields each have a component substantially along that orthogonal axis. For example, the coils may be mutually arranged such that there are two triplets of antenna coils and each triplet of antenna coils includes, for each of the three orthogonal axes, at least one antenna coil whose magnetic field has a component along that orthogonal axis.

In the specification, for simplicity, the number of antenna coils is assumed to be 6, however, it is appreciated that any suitable number N of antenna coils in excess of 6 may be employed, particularly for redundancy purposes.

It is a particular feature of a preferred embodiment of the present invention that the antenna coils need not be exactly mutually orthogonal and certainly need not be arranged such that the centers of the antenna coils coincide. This is advantageous because it allows greater flexibility in positioning the antenna coils in the range in which the object is known to move, such that the antenna coils are well distributed such that the object can be accurately and rapidly positioned in all portions of the range. Also, this tends to cut down production costs because it is not necessary to precision-position the coils in a mutually orthogonal configuration.

In accordance with a preferred embodiment of the present invention, each of the at least six RF transmitters 10, 12, 14, 16, 18 and 20 comprises an oscillator which provides a sinusoidal signal output. Preferably, the signal outputs from the signal sources are in the range of 10–100 KHz.

In accordance with a preferred embodiment of the present invention, a positioning sensor 40 is provided for sensing the spatial and/or angular position of a magnetic field detector (50 in FIG. 2) included therein. The positioning sensor also, of course, senses the spatial and/or angular position of any objects which are fixed with respect to the magnetic field detector 50 of FIG. 2. The spatial and/or angular position is typically computed relative to a predetermined reference coordinate system. A preferred implementation of sensor 40 is described in detail below with reference to FIG. 2.

It is a particular feature of a preferred embodiment of the present invention that positioning sensor 40 employs a single magnetic detector (50 in FIG. 2) which outputs to an on-board digital signal processor circuit (62 in FIG. 2), which, in turn, provides an output indication of the spatial and angular positions of detector 50, each in three dimensions.

The detector 50 may comprise a multi-axis magnetic detector. Alternatively, the detector 50 may comprise a one-axis antenna coil, as illustrated in FIG. 2, or may alternatively comprise any other suitable type of one-axis magnetic field detector, such as a Hall-effect detector or a solid state component e.g. a magneto-resistive detector or a magneto-diode or a magneto-transistor.

The sensor 40 is attached to a moving object or individual 30, such as a person, whereas the RF transmitters are stationary. If the moving object or person 30 is not rigid, there may be a plurality of sensors 40 and each of these is attached to a corresponding one of a plurality of portions of the moving object or individual, as shown in FIG. 1a. This allows monitoring of the spatial and angular positions of these individual portions.

The term "moving object" is intended to refer to an object of interest which is moving at least a part of the time or which has at least one part which is moving at least a part of the time. Alternatively, the "moving object" may not itself be in motion but its position relative to another object which is sometimes in motion, is of interest. In summary, the term "moving object" is intended to refer to any object whose absolute or relative location is of interest to a user.

The RF transmitters may be fairly close together, e.g. even less than one meter apart however, most advantageously, they are as far apart as is feasible, depending on the application.

A particular feature of a preferred embodiment of the present invention is that localization is performed despite the fact that the dynamic range of the amplitudes $C^1, \ldots, C^6$ of the at least six magnetic signals generated respectively by the six transmitter coils 10, 12, 14, 16, 18 and 20 is typically very large. More generally, there are N amplitudes $C^1, \ldots, C^N$, however, for simplicity, the specification sometimes follows the example wherein N=6.

Figure 1B:
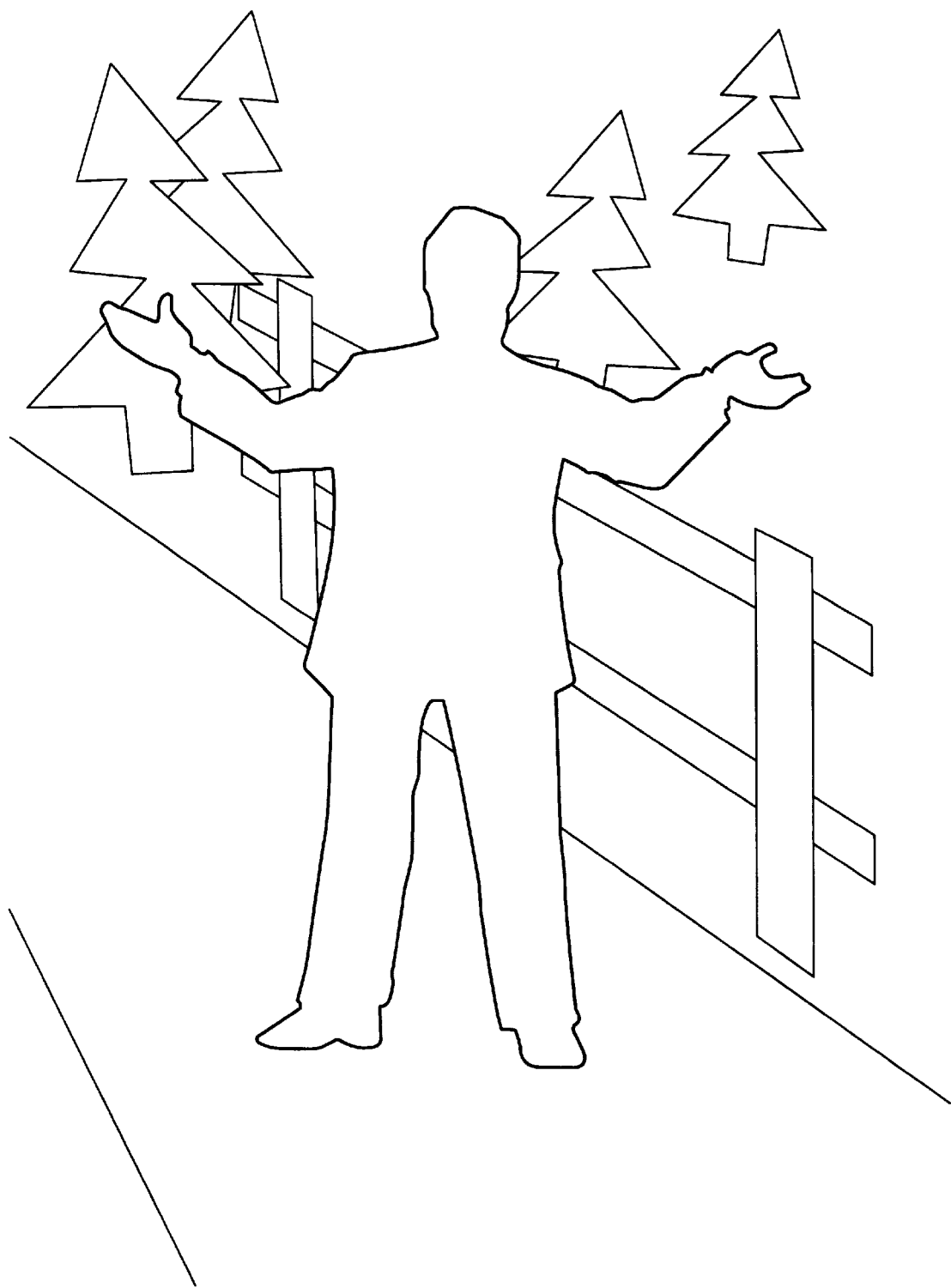

FIG. 1b is a display image generated by a virtual reality application of the system of FIG. 1a. A virtual reality system receives the position outputs generated by the system of FIG. 1a and generates the display image of FIG. 1b which includes a computer-generated scene (fence, path and trees in the illustrated embodiment) and a figure having body part motion which mimics the body part motion of the human user of FIG. 1a as detected by the positioning system of FIG. 1a.

Figure 1C:
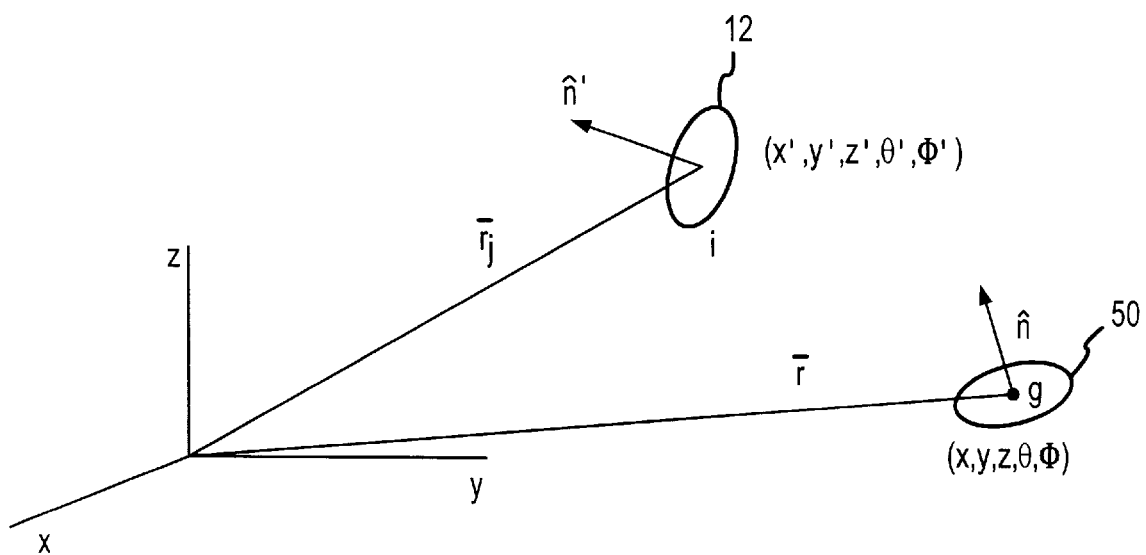
FIG. 1c is a detailed diagrammatic illustration of an RF transmitter and a positioning sensor provided in accordance with a preferred embodiment of the present invention.

FIG. 1c is a detailed diagrammatic illustration of one of the N RF transmitters of FIG. 1a., such as RF transmitter 12, and one of the detection coil 50 of the positioning sensors 40 provided in accordance with a preferred embodiment of the present invention. As shown, the spatial and angular position of the i'th RF transmitter (i=1, ..., N) is denoted as ($x^i$, $y^i$, $z^i$, $\theta^i$, $\phi^i$ including its quadrant) and the spatial and angular position of an individual positioning sensor 40 is denoted as (x, y, z, $\theta$, $\phi$ including the sensor's quadrant).

Referring to FIG. 1c the magnetic field at the point g at the center of the magnetic detector 50 due to a current flowing in a thin conducting circular loop representing the source i is well known in the literature and may be expressed in terms of Elliptic integrals of the first and second kind as described in J. D. Jackson, *Classical Electrodynamics,* Wiley, Second Ed., 1975, Chapter 5, p. 178. Since working with such integrals is cumbersome, it is alternatively possible to use approximate expressions as described herein.

When the distance between origin and the i'th source loop center ($\vec{r}^i$) to the point of observation ($\vec{r}$) is large in comparison with the loop radius $a^i$, (where $a^i << |\vec{r}-\vec{r}^i|$), the exact integral can be expanded into a power series $$\frac{a^i}{|\vec{r}-\vec{r}^i|}$$

which is known to be small. The magnetic field may thus be written as:

$$B^i = B^i_I + B^i_{II} + \quad (1)$$

The first and the sum of the first and the second terms of the power series is given by Equations 2 and 3 respectively:

$$\vec{B}^i_I = \frac{\beta^i}{|\vec{r}-\vec{r}^i|^3}\left[\frac{3\cdot(\vec{r}-\vec{r}^i)\cdot\left[(\vec{r}-\vec{r}^i)\cdot\hat{n}^i\right]}{|\vec{r}-\vec{r}^i|^2} - \hat{n}^i\right], i=1,2,\ldots,N \quad (2)$$

where $\hat{n}^i$ is the unit vector representing the normal to the RF transmitter coil plan, if a one-axis antenna coil is used as the transmitter, and:

$$\vec{B}^i_I + \vec{B}^i_{II} = \frac{\beta^i}{|\vec{r}-\vec{r}^i|^3}\left[\frac{3\cdot(\vec{r}-\vec{r}^i)\cdot\left[(\vec{r}-\vec{r}^i)\cdot\hat{n}^i\right]}{|\vec{r}-\vec{r}^i|^2}(1-\delta) - \hat{n}^i(1-\gamma)\right], \quad (3)$$

$$i=1,2,\ldots,N$$

where:

$$|\vec{r} - \vec{r}^i| = \sqrt{(x-x^i)^2 + (y-y^i)^2 + (z-z^i)^2} \quad (4)$$

and:

$$\beta^i = \frac{\mu_0 A^i \cdot T^i \cdot I^i(t)}{4\pi} \quad (5)$$

$$\delta = \frac{5}{3}\left(\frac{a^i}{|\vec{r}-\vec{r}^i|}\right)^2 [-3 + 7[(\vec{r}-\vec{r}^i)\cdot \hat{n}^i]^2] \quad (6)$$

$$\gamma = \frac{9}{8}\left(\frac{a^i}{|\vec{r}-\vec{r}^i|}\right)^2 [-1 + 5[(\vec{r}-\vec{r}^i)\cdot \hat{n}^i]^2] \quad (7)$$

where:

$I^i$ (t)=the current in the loop i, all the currents in the system are assumed harmonically time dependent;

$A^i$=the $i^{th}$ source coil area.

$T^i$=the number of turns in the ith source coil;

$I^i$=the current in the ith source coil; and the magnetic permeability ($\mu$) in the air is given by $\mu = \mu_0 \mu_r$, where $\mu_r$ is the magnetic permeability of the transmitter core.

The accuracy of the first term of the series $B^i_T$ is improved as the quotient of $$\frac{a^i}{|\vec{r}-\vec{r}^i|}$$

gets smaller because the inaccuracy is of the order of the square of the quotient of $$\frac{a^i}{|\vec{r}-\vec{r}^i|}.$$

For example, when the quotient is greater than 0.05, the expected error of the above approximation is of the order $10^{-4}$. However, the condition of $a^i << |\vec{r}-\vec{r}^i|$ is not always fulfilled, especially in cases where the transmitters are distributed throughout the entire volume of the object's range, in order to improve system performance. In these cases, the second term in Equation 1 becomes significant. When detector 50 comprises a coil, then assuming that the detector coil's radius is very small relative to the transmitter coil, the electromagnetic force $\epsilon^i$ induced on the coil 50 by the transmitter coil i located at coordinates $r^i$ is given by:

$$\varepsilon^i = \frac{d}{dt}[\vec{B}^j \cdot \hat{n}] \cdot A^d = \frac{\chi^i}{|\vec{r}-\vec{r}^i|^3}\left[\frac{3}{|\vec{r}-\vec{r}^i|^2}(D_1 \cdot D_2) - D_3\right], \quad (8)$$

$$i = 1, 2, \ldots, N$$

where:

$$\chi^i = \frac{dI^i}{dt} \cdot A^d \cdot T^d \quad (9)$$

Preferably the transmitter coil is driven by a time harmonic dependent current, and thus:

$$X^i = \omega^i \cdot A^d \cdot T^d \quad (10)$$

where $$\omega^i = 2\pi f \quad (11)$$

is the angular frequency of the current in source i and $A^d$=Is the detector's coil area.

$T^d$=Is the number of turns in the detector coil and $$D_1 = \sin \theta^i \cos \phi^i(x-x^i) + \sin \theta^i \sin \phi^i (y-y^i) + \cos \theta^i(z-z^i) \quad (12)$$

$$D_2 = \sin \theta \cos \phi(x-x^i) + \sin \theta \sin \phi(y-y^i) + \cos \theta(z-z^i) \quad (13)$$

$$D_3 = \sin \theta^i \cos \phi^i \sin \theta \cos \phi + \sin \theta^i \sin \phi^i \sin \theta \sin \phi + \cos \theta \cos \theta^i \quad (14)$$

The voltage induced by the i'th source, at point Y(t) in the sensor circuit shown in FIG. 2, is given as follows:

$$V^i = C^i \lambda^i \quad (15)$$

where:

$$C^i = \frac{1}{|\vec{r}-\vec{r}^i|^3}\left[\frac{3}{|\vec{r}-\vec{r}^i|^2}(D_1 \cdot D_2) - D_3\right], \quad i=1, 2, \ldots, N \quad (16)$$

and:

$$\lambda^i = \frac{\mu_0 A^i \cdot T^i \cdot I^i \cdot \chi^i \cdot \Psi(\omega^i)}{4\pi} \quad (17)$$

where $\Psi$ is the transfer function of the coil and its front-end electric circuit up to the point Y(t) in FIG. 2 or FIG. 8.

The transformation between the Cartesian notation to the polar notation is given by the following system of three equations;

$$\begin{cases} \cos\alpha = \sin\theta\cos\phi \\ \cos\beta = \sin\theta\sin\phi \\ \cos\gamma = \cos\theta \end{cases} \quad (18)$$

In order to specify the position and orientation of the sensor there are preferably at least 6 sources positioned at 6 respective different locations in space such that the projection on the axes of the Cartesian coordinate system of 3 out of the N>=6 sources form an orthogonal set. The 6 sources allow the 5 coordinates (x, y, z, θ, φ) of spatial and angular position to be derived, plus a sign which removes the ambiguity of the direction of the normal vector from the sensor coil.

Figure 1D:
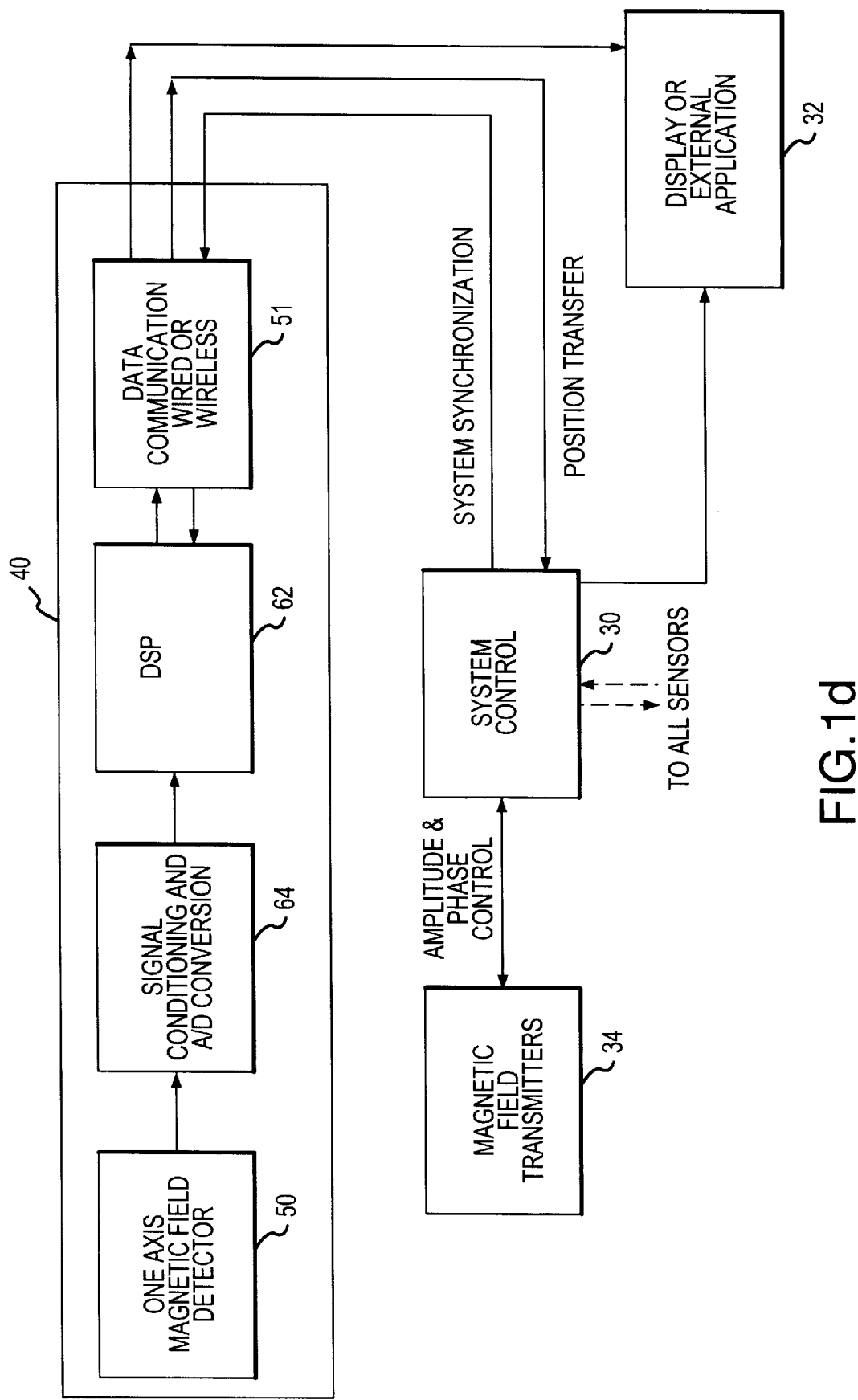

A block diagram of the disclosed system is shown in FIG. 1d. The magnetic field transmitters block 34 comprises of N transmitters, where N≧6. These transmitters radiate simultaneously at N different frequencies. The amplitude and phase of each of the N transmitters is controlled by the system control block 30. The magnetic field is detected by a magnetic field detector block 50. The output of the magnetic signal detector 50 is a voltage signal proportional to the superposition of the N magnetic field transmitters at the coordinates $x^i$, $y^i$, $z^i$, $\theta^i$, $\phi^i$. This signal is introduced to the signal conditioner block and A/D converter block 64, which amplifies and filters the input signal to a proper bandwidth around the system working frequencies. The signal is then digitized by the Analog to Digital (A/D) converter and is transferred to the Digital Signal Processor (referred to as DSP hereafter) block 62 as an input data.

Another input data introduced to the DSP is the synchronization signal through the communication module 51 which receives the synchronization data from the system control 30 by the use of a wire line or wireless. The synchronization signal determines the signals polarity at the detector 50 relative to the magnetic transmitters as described below. The synchronization input to the DSP block is updated at a very slow rate compared to the magnetic detector input, as described below. The digitized input data from the of the magnetic detector 50 is then used by the digital signal processor unit 62 to calculate the position and orientation coordinates of the magnetic detector 50. The output from the digital signal processor unit 62 is then transferred to the Data Communication unit 51 and then to the System Control Unit 30. The refresh rate of the output data is of the order of few times per second to a few hundred times per second.

The position data may then be transferred to the system control unit via wireline or wireless data communication procedure that may optionally display or further process the positioning information of sensor 40. The system control unit also controls the amplitudes and phases of the N magnetic transmitters in the system.

In accordance with a preferred embodiment of the present invention, the system control unit 30 in FIG. 1d, may be composed of a separate unit block 32 to collect spatial position data from all sensors 40 to be displayed or to be used by an external application unit. Alternatively, the positioning information from one or all sensors may directly be received by an external application unit.

Reference is now made to FIG. 2, which is a simplified block diagram illustration of a preferred implementation of an individual one of the positioning sensors 40 of FIG. 1a. As shown, a magnetic field detector 50 (such as, in the illustrated embodiment, a coil), outputs via an amplifier 52 and a bandpass filter (BPF) 54 to a programmable differential amplifier (also termed herein PGA or "programmable gain amplifier") 56 having programmable gain control. The two inputs to the differential amplifier 56 are Y(t) and $HX^P$(t) which is the best prediction to the signal Y at the time t. The differential amplifier 56 outputs an analog signal which is proportional to $Y^d(t)=Y(t)-HX^P(t)$. The analog signal is passed through a low pass filter 58 which removes disturbances and noise above the working frequencies. This signal is digitized by an A/D converter 60 and introduced to digital signal processing circuitry 62. Digital signal processing circuitry 62, whose operational modes will be described below in detail, provides a gain-control output to differential amplifier 56 and also provides a feedback output via a digital-to-analog converter 66, and preferably via an amplifier 68 and a low pass filter 70, to a feedback input of differential amplifier 56.

The feedback output of the DSP unit 62, which is the best discrete prediction of Y(t), is termed herein $HX^P_j$.

Reference is now made to FIG. 3, which is a simplified block diagram illustration of a preferred implementation of the digital signal processing unit 62 in the sensor illustrated in FIG. 2.

Figure 9:
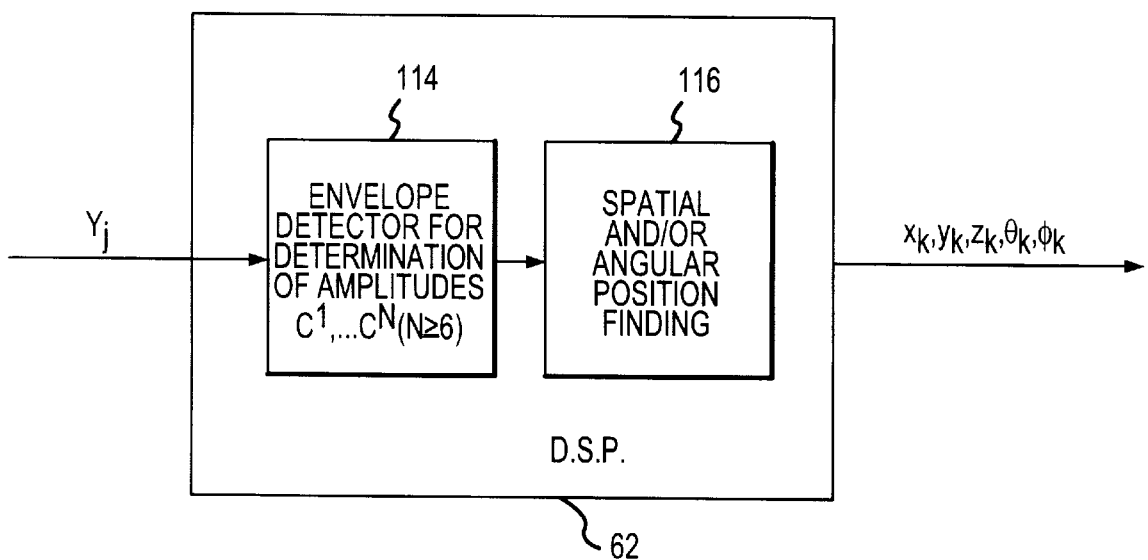
FIG. 9 is a simplified block diagram illustration of a preferred digital signal processing unit useful in the sensor of FIG. 9.

The apparatus of FIG. 3 includes a tracking and control subsystem 110 which is omitted in another implementation of DSP unit 62 (FIG. 9). The tracking and control subsystem 110 is a participant in a feedback loop shown in FIG. 2 and comprises unit 110 as well as units 66, 68 and 70. These units are operative to limit the dynamic range of the input signal Y(t) to A/D unit 60, which is advantageous because A/D unit 60 may then comprise a common and relatively low cost unit such as a 16 bit A/D converter.

Alternatively, the tracking and control subsystem of FIG. 3 and the feedback loop of FIG. 2 may be omitted, as shown in FIGS. 8 and 9 respectively. In which case the A/D unit 60 typically comprises a relatively high cost, high resolution unit such as a 20–24 bit A/D converter to get the same performances as with the tracking and control subsystem and the feedback loop.

It is a particular feature of a preferred embodiment of the present invention that the above units improve the dynamic range of the input signal without the need for further electronic components commonly used in the art.

The apparatus of FIG. 3 includes a tracking and control subsystem 110 which, for the reasons described above, is operative to increase the precision of the spatial and angular position determinations by sampling the output of sensor 40. Specifically, tracking and control subsystem 110 receives a digital input from A/D converter 60 (FIG. 2). Tracking and control subsystem 110 provides a digital output to the D/A converter 66 (FIG. 2). The functionality of tracking and control subsystem 110 is to manage a feedback loop which also includes amplifier 68, low pass filter 70, differential amplifier 56, and AID converter 60, such that the A/D converter 60 operates on a relatively small dynamic range signal which is provided thereto by differential amplifier 56. The tracking and control subsystem 110 may for example comprise a Kalman filter such as the filter illustrated in FIG. 4.

Alternatively, any suitable curve-fitting method, such as cubic or higher order interpolation based on a suitable metric such as least squares, may be used to fit a curve to the output samples generated by A/D 60. Thereby the input signal Y(t) to the differential amplifier 56 is approximated to an acceptable degree.

The output of block 110 is a full dynamic range signal, which may have a dynamic range which is three orders of magnitude greater than that of the signal which passes through A/D converter 60.

The output of block 110 is supplied to an envelope detector 114, which is operative to determine the received envelope amplitudes (magnitude and sign) $C^1, \ldots, C^6$ of at least six magnetic carrier signals received from the six transmitter coils 10, 12, 14, 16, 18 and 20 respectively.

The output of the envelope detector 114 is supplied to the position determination unit 116. Unit 116 is operative, based on the signal amplitude values supplied by unit 114, to provide an output indication of the spatial and/or angular position of the magnetic field detector 50 in sensor 40 (FIG. 1). A preferred method of operation for the position determination unit 116, based on a genetic process for obtaining the final position and orientation of the object of interest, is described below with reference to FIGS. 7a–7c.

Figure 4:
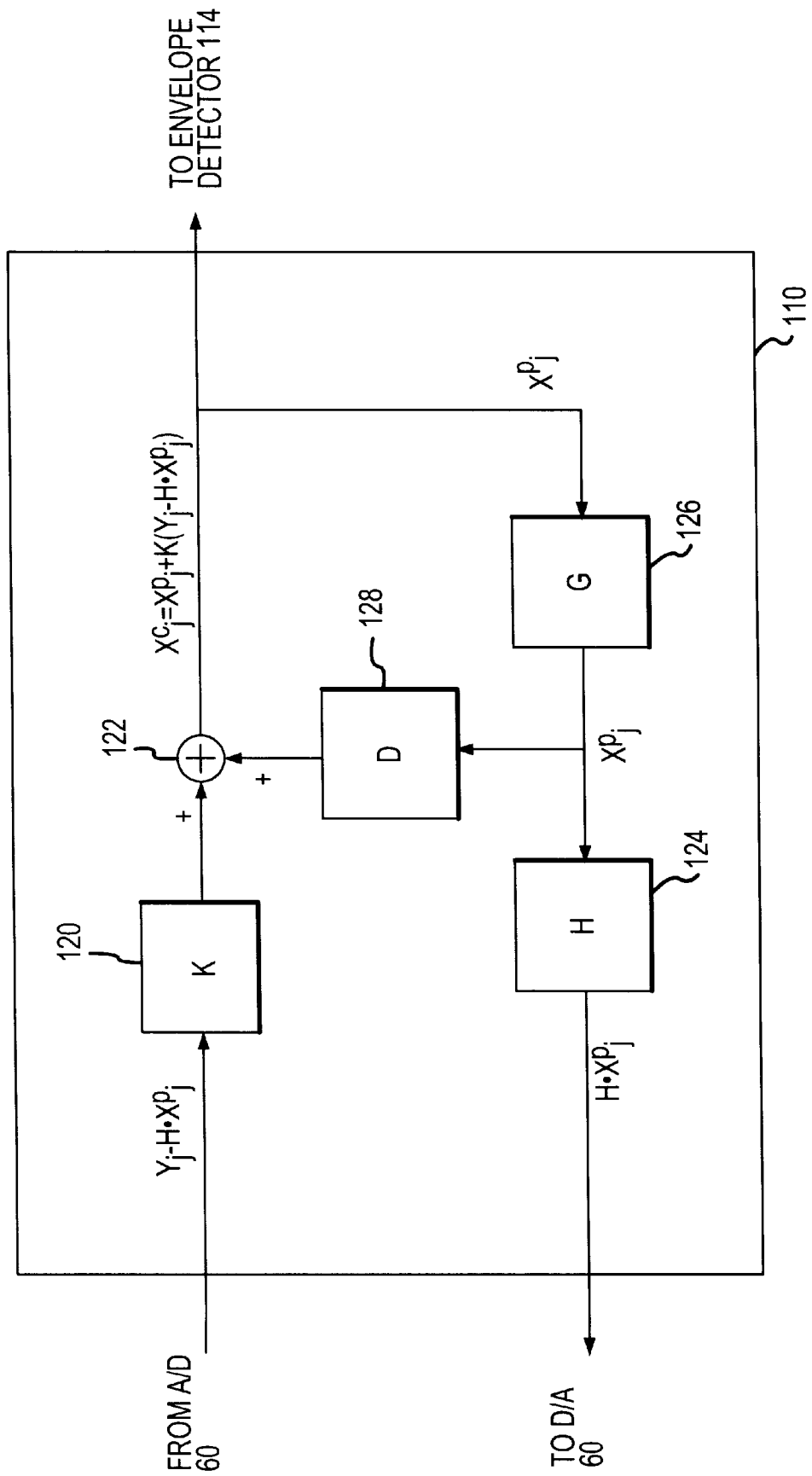
FIG. 4 is a simplified block diagram illustration of the tracking and control subsystem of FIG. 3, constructed and operative in accordance with a preferred embodiment of the present invention.

FIG. 4 is a simplified block diagram illustration of the tracking and control subsystem of FIG. 3, constructed and operative in accordance with a preferred embodiment of the present invention.

The tracking and control subsystem 110 of FIG. 4 preferably comprises an linear predictive Coding module (LPC) as described for example in *Digital Coding of Waveforms* by Jayant N. S., Englewood Cliffs, N.J.; Prentice Hall, 1984. The LPC module of FIG. 4 typically comprises several units interconnected as shown to generate an output signal comprising a best prediction to the input signal $Y_j$ where the index j is a sample index. The K block 120 may comprises a conventional Kalman gain unit or more generally any filter gain unit. The G unit 126 comprises a one step transition matrix. The D unit 128 provides a delay for synchronization between the input and the prediction vector. The H unit 124 comprises a coefficients matrix for selection of the prediction signal from the prediction vector.

The quantity $X^P$ is a vector of prediction for Y. The parameter $X^c$ is a vector of correction for $X^P$ and is obtained by computing a correction of the vector $X^c_j$ given $X^P_j$.

$$X^c_j = X^P_j + K(Y_j - H \cdot X^P_j) \tag{19}$$

The input $Y_j^d$ to the LPC module of FIG. 4, as shown, is the difference between the predicted signal $X_j^P$ (the prediction of $X_j$ given $X_{j-1}$) and the input signal $Y_j$, i.e.:

$$Y_j^u = Y_j - HX_j^p \tag{20}$$

The tracking and control system of FIG. 4 has two outputs, as shown, to the D/A unit 66 and to the envelope detector 114. The output to the envelope detector 114 is the best estimation to $Y_j$.

Figure 5:
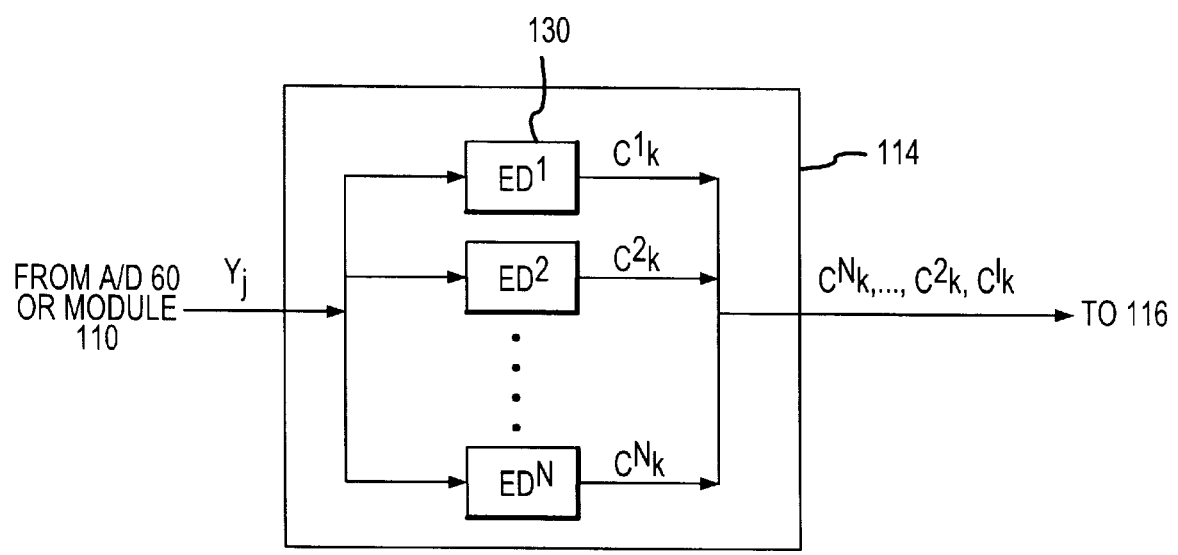
FIG. 5 is a simplified block diagram illustration of the envelope detector of FIG. 3, constructed and operative in accordance with a preferred embodiment of the present invention.
Figure 6A:
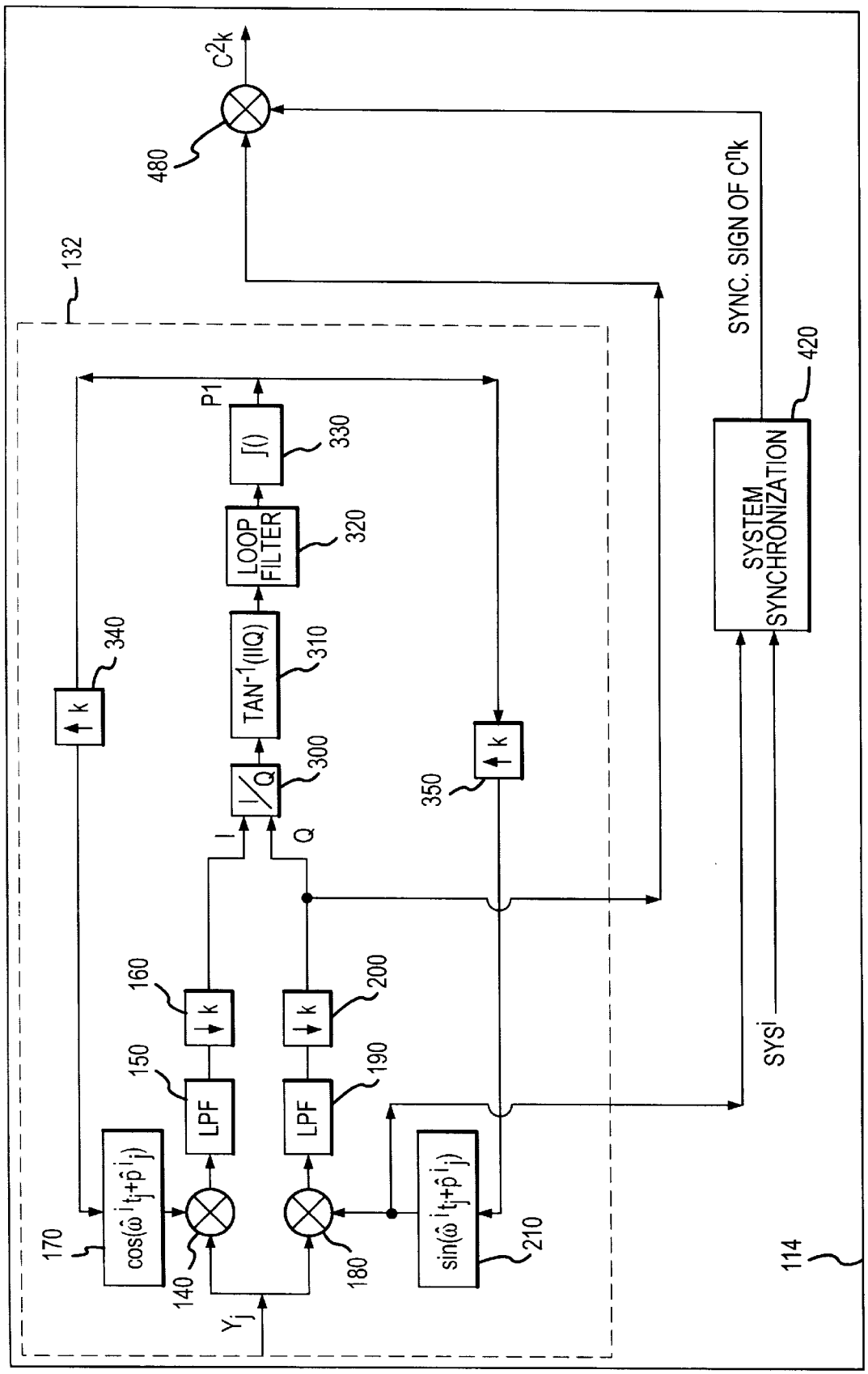
FIG. 6a is a simplified block diagram illustration of one of the envelope detecting (ED) modules of FIG. 5, constructed and operative in accordance with a preferred embodiment of the present invention.

FIG. 5 is a simplified block diagram illustration of the envelope detector 114 of FIG. 3, constructed and operative in accordance with a preferred embodiment of the present invention. As shown, the envelope detector 114 of FIG. 3 preferably comprises N envelope detecting (ED) modules 130 (where N=6 in the illustrated embodiment). Each module determines the received envelope amplitude (magnitude and sign) $C^i(t_k)$ of one of the N magnetic carrier signals received, in the illustrated embodiment, from one of the N=6 transmitter coils 10, 12, 14, 16, 18 and 20.

FIG. 6a is a simplified block diagram illustration of the i'th envelope detecting (ED) module 130 of FIG. 5, constructed and operative accordance with a preferred embodiment of the present invention.

Figure 6B:
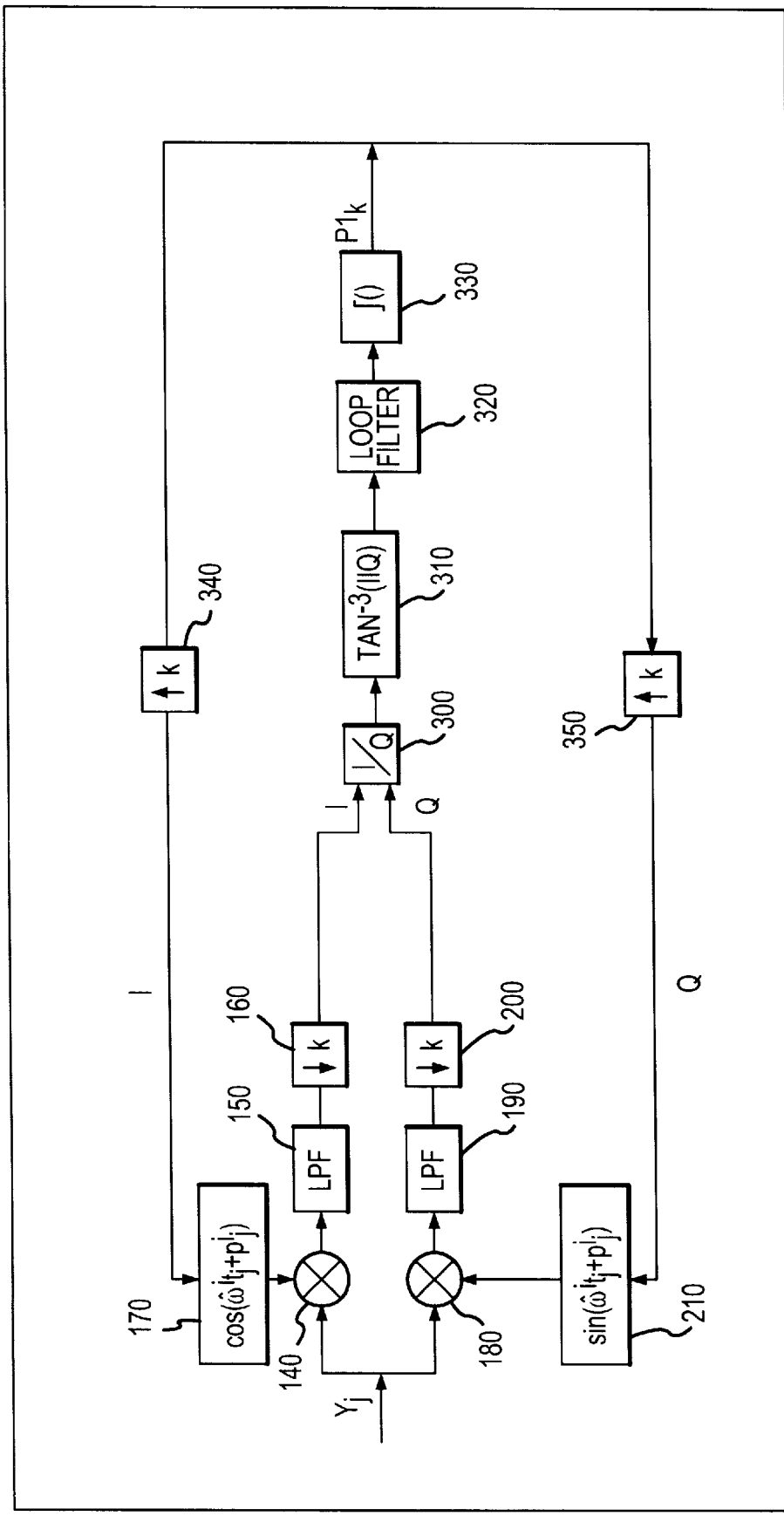
FIG. 6b is a simplified block diagram illustration of a PLL sub-module forming part of the apparatus of FIG. 6a and FIG. 6c.
Figure 6C:
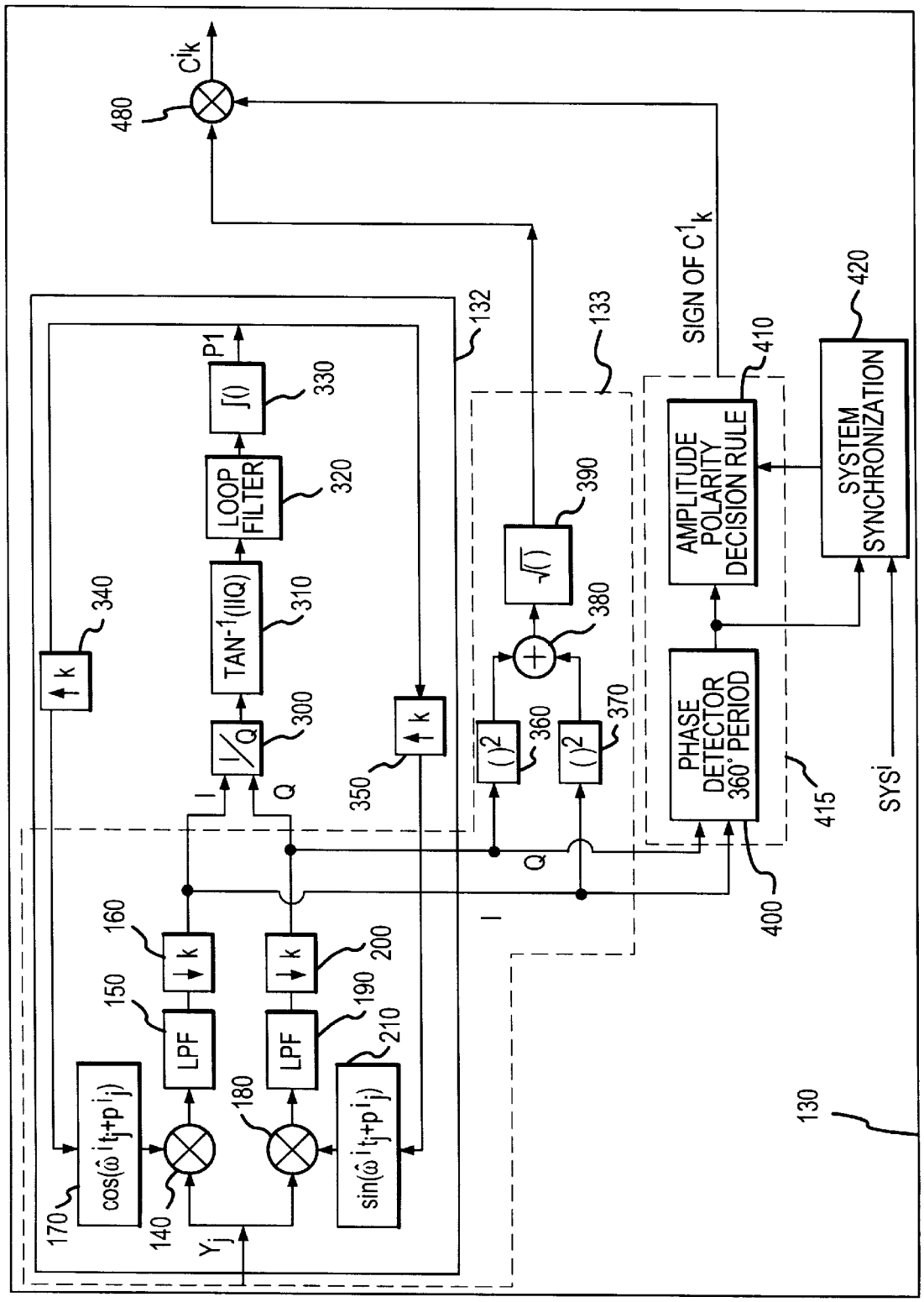
FIG. 6c is simplified block diagram of an alternative configuration of one of the ED's.

In FIGS. 6a–c, the phase is denoted by the letter "p", rather than the more conventional $\phi$, in order to prevent confusion between the letter $\phi$ which, in the present specification, is used to denote one of the two angular position coordinates.

The i'th envelope detector module (ED) 130 is operative to extract the strength of the electromagnetic interaction between the detector 50 and the i'th transmitter, from the electromagnetic signal received by the detector 50.

The input to the i'th ED module 130 is a time series $Y(t_j)$. This series is a superposition of the N sinusoidal waves, each amplitude modulated according to the relative position between the detector 50 and the i'th transmitter. The input sine series is defined by:

$$Y(t_j) = \sum_{i=1}^{N} C^i \cdot \sin(\omega^i t_j + p^i) \tag{21}$$

The output of the i'th ED module 130 is time-series of the i'th signed envelope $C^i(t_k)$. The envelope detection is similar for all N transmitters. Therefore, only the detection of a single envelope is described below. The process is performed N times, i.e. once per transmitter, preferably in parallel, by N ED modules 130 respectively.

Each ED module typically comprises two sub-modules. These modules are: a Phase Lock Loop (hereafter PLL) 132, described in detail below with reference to FIG. 6b and a System synchronization unit 420, is then called to define the absolute sign of the signal amplitude.

Reference is now made to FIG. 6b which is a simplified block diagram illustration of the PLL sub-module 132 forming part of the apparatus of FIG. 6a.

The Phase-locked loop (PLL) unit of FIG. 6b is a control system that follows the phase and frequency of its input. Given the angular velocity $\omega^i$ of a sinusoidal waveform contained in its input signal, the PLL follows its phase and compensates for small frequency fluctuations. There are several well known PLL configurations. One such configuration useful for implementing the PLL unit of FIG. 6b is the Tanlock PLL, described in *Phase locked and Frequency Feedback Systems: Principles and Techniques*, J. Klapper and J. T. Frankle, Chapter 8, p. 256, Academic Press, New York, 1972. The Tanlock configuration, as shown in FIG. 6b, uses both I and Q branches to close the phase loop.

As the input signal $Y(t_j)$ enters the PLL it is multiplied by:

$$Si(t_j) = \sin(\hat{\omega}^i_j t_j + \hat{p}^i_j) \tag{22}$$

For the Q branch.
and $$Co(t_j) = \cos(\hat{\omega}^i_j t_j + \hat{p}^i_j) \tag{23}$$

For the I branch.
Here $\hat{\omega}_j^i$ and $\hat{P}^i_j$ are the estimated values in the PLL procedure, of frequency $\omega^i$ and the phase $P^i$ at the time $t_j$. Initially $\hat{P}^i_j$ is zero and $\hat{\omega}^i$ is set to the nominal frequency of the i'th carrier. Low pass filters 150 and 190 filter the results of the multiplication by 170 and 210 respectively. For $\hat{\omega}^i = \omega^i$ and after the proper filtering process, only the envelope remains, i.e. the slowly changing component of the i'th input.

The envelope of the Q channel after multiplying by 2 is given by:

$$LPC^i(t_j) = C^i(t_j) \cdot \cos [\Delta p(t_j)] \tag{24}$$

where $$\Delta p^i(t_j) = [p^i(t_j) - \hat{p}^i(t_j)] \tag{25}$$

Similarly the envelope of the I channel after multiplying by is given by:

$$LPS^i(t_j) = C^i(t_j) \cdot \sin [\Delta p^i(t_j)] \tag{26}$$

As shown in FIG. 6b, the unit 310 the phase-error of the PLL is computed according to:

$$\Delta p^i(t_j) = \tan^{-1}\left[\frac{LPS^i(t_j)}{LPC^i(t_j)}\right] \tag{27}$$

This phase error $\Delta p^i(t_j)$ is used by the PLL to update its own frequency. A Proportional—Integral (PI) controller 320, also termed herein a "loop filter", is used to compute a correction to the frequency. The transfer function F(s) characterizing the PI controller is defined by:

$$F(s) = K(1 + K_1/s) \tag{28}$$

where s is Laplace operator and K and $K_1$ are constants of the control loop filter 320, and are set such that the closed loop bandwidth is approximately 1 Hz and the damping factor is approximately in the range of 0.7–1.0.

It is a particular feature of a preferred embodiment of the present invention to bring the PLL to oscillate in phase with the corresponding component in the input signal. When this happens the PLL is said to be 'locked'. In this situation the I branch (i.e. the filtered cosine multiplication) and $\Delta p^i(t_j)$ would both approach zero. When the PLL is locked the output of the down decimation block 200 in the Q branch determines the sine envelope $C^i(t_k)$.

The PLL configuration of FIG. 6b has several advantages over other implementation possibilities in the art:

a. It has good tracking characteristics due to combined I and Q tracking.

b. Its dynamic properties, specifically bandwidth, and its damping factor do not depend on the input amplitude.

Referring back to FIG. 6a, the System synchronization Sub-module 420 is now described. The extraction of signed amplitude is possible if the initial phase of the carrier is known. Otherwise, the system never knows if it is locked to the carrier or it is out of phase to it. Therefore, an auxiliary synchronization mechanism 420 is provided. At fixed intervals the ED 130 of FIG. 6a receives an auxiliary signal $SYS^i$ composing a time series of ones and zeros. This synchronization signal ($SYS^i$) is one when the carrier is positive, and zero otherwise. When $SYS^i$ arrives, the output of 210 of FIG. 6a, i.e. the PLL's estimated sine wave, is cross-correlates it with $Y(t_j)$ over a time period of approximately 100 msecs. If $Y(t_j)$ appears to be in anti-correlation with $SYS^i$ then $Y(t_j)$ is multiplied by −1.

Another ED configuration shown in FIG. 6c. This configuration has an advantage over the previous configuration due to its ability to determine sine envelope $C^i(t_k)$ to the next stage without dependency on the loop 'locking'. This configuration comprises three sub-modules operating in parallel and another sub-module operative rarely. The three sub-modules are: a Phase Lock Loop (hereafter PLL) 132, a Non-coherent absolute envelope-detector 133, described in detail below with reference to FIG. 6d and a Sign Detection Unit 415. The fourth sub-module, a System synchronization unit 420.

The PLL sub-module 132 and the System synchronization 420 are identical in both configurations and were described above. The Non-coherent absolute envelope-detector sub-module 133 and the Sign Detection Unit 415 are described hereinbelow.

We now refer to the Sign Detection Sub-module 415 shown in FIG. 6c. In the alternative configuration the Sign detection Sub-module is needed because this sub-module has to be operative even when the PLL unlocked. When the i'th transmitter changes sign the effect is of changing the sign of the carrier signal. When the PLL is unlocked, a sign change of the carrier does not change the sign of phase estimated by the PLL $\hat{P}^i_j$. In this configuration the two branches of the PLL has a symmetry of 180° and not 360°. To follow and correct the phase change of the carrier signal module 415 uses a 360° phase detector which has a symmetry of 360°.

Referring now back to the System synchronization Sub-module 420. As shown in FIG. 6c the auxiliary signal is cross correlated with the output of sub-module 400 which contains the proper phase of the ED module 130.

Figure 6D:
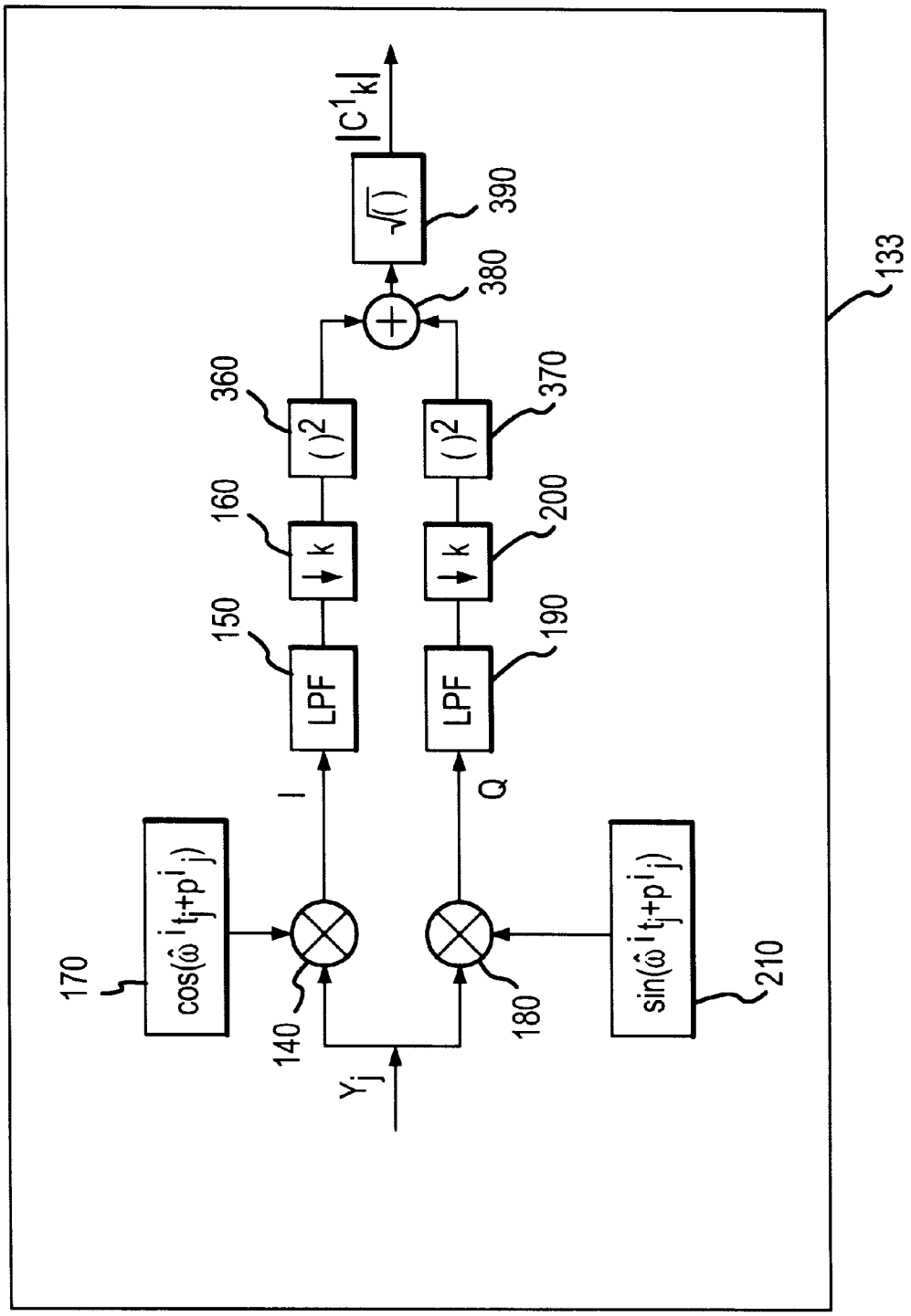
FIG. 6d is a simplified block diagram illustration of an envelope detector sub-module forming part of the apparatus of FIG. 6c.

Reference is now made to FIG. 6d which is a simplified block diagram illustration of a non-coherent absolute value envelope detector sub-module 133 forming part of the apparatus of FIG. 6a. The amplitude of the corrected voltage signal, at the relevant frequency, as synthesized by the raw detected signal as defined above, is given by:

$$|C^i(t_j)| = \sqrt{LPC^2 + LPS^2} \qquad (30)$$

where

LPC as defined by equation 24 is the output of block 150 in FIG. 6d, similarly

LPS as defined by equation 26 and is the output of block 150 in FIG. 6d.

It is appreciated that the two variations of PLL based implementations of FIGS. 6a–6d are only two possible implementations of envelope detector 114 of FIG. 3. Alternatively, the envelope detector 114 may, for example, be based on Fourier transforms.

Figure 7A:
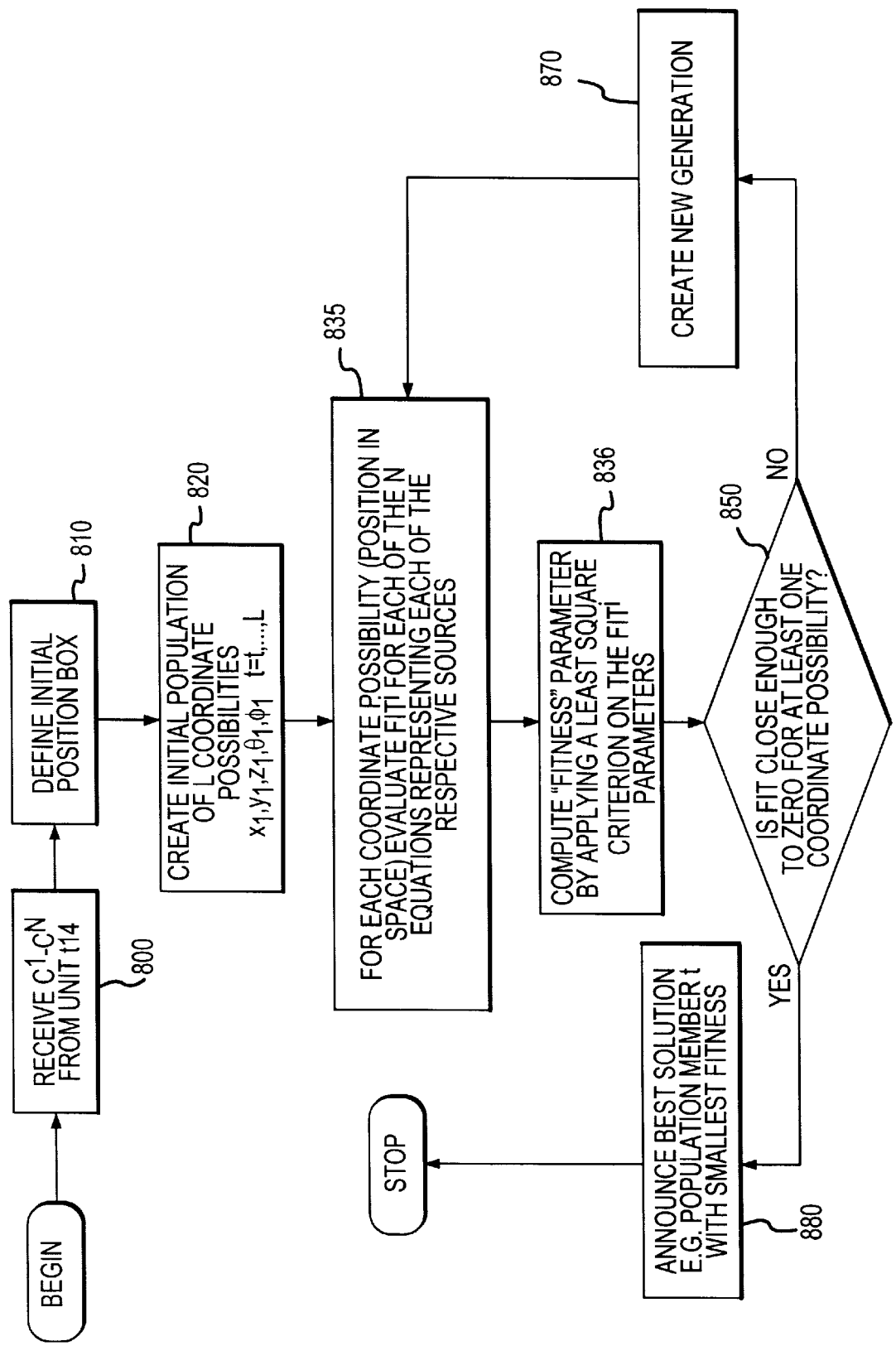
FIG. 7a is a simplified flowchart illustration of a preferred method of operation for the position finding subsystem of FIG. 3, based on a genetic process for obtaining the final position and orientation of an object of interest.

Reference is now made to FIG. 7a which illustrates one suitable method of operation for position determination unit 116, based on an iterative Genetic process for obtaining the final position and orientation of an object of interest.

Genetic algorithms are described in *Genetic algorithms in search: optimization and machine learning,* D. Goldberg, 1989; and in

*An introduction to genetic algorithms,* Melanie Mitchell, 1996.

As described above, unit 116 is operative, based on envelope amplitude values $C^i$, (i=1, ..., N; including sign), of the magnetic signal Y(t), to provide an output indication of the spatial and/or angular position of the magnetic field detector 50 in sensor 40 (FIG. 1c). The output indication typically includes spatial and angular position information, e.g. three position coordinates, typically Cartesian coordinates x, y, z; plus angular position information such as (θ and φ including its quadrant).

The method of FIG. 7a is based on solving N analytic equations with 6 unknowns (step 835, is described in detail with reference to FIG. 7b).

If N>6, there are more than 6 equations in 6 unknowns. This redundancy may be used to increase accuracy of the system, preferably by applying an averaging process to the measured amplitudes, of the signals at their different frequencies, representing the magnetic field parameters.

In step 800, N amplitude values are received from unit 114.

In step 810, an initial position box is defined for the magnetic detector 50. The definition of the initial position box typically depends on the mode of operation of the positioning system which is typically selected from two possible modes: an initial positioning/reset mode and a tracking mode.

The initial positioning/reset mode is intended for situations in which there is no knowledge available, or insufficient reliable knowledge available, regarding the prior position of the detector 50. If the system is operating in this mode, the initial position box is simply the entire area in which the system is operative.

The tracking mode is intended for situations in which there is knowledge available regarding the prior position of the detector. If the system is operating in tracking mode, step 810 uses available knowledge regarding the maximum velocity of the moving object or individual 30 to which sensor 40 is attached, in order to define an initial position box within which the detector 50 must be after a predetermined period of time.

In step 820, an initial population of coordinate possibilities is defined, i.e. a suitable number of sets of possible values for each of the components of the output (3 spatial coordinates and 3 angular coordinates, typically θ and φ including its quadrant). A suitable number L of members in the initial population is, for example, L=100. It is appreciated that the larger the initial population, the less iterations are required to obtain a solution. Typically, the initial population is generated by randomly selecting sets of possible values within the initial position box. Alternatively, the initial population may be generated by selecting a predetermined number of possible values which are suitably dispersed, e.g. uniformly dispersed, within the initial position box.

In step 835, the fit of each individual coordinate possibility is computed, as described in detail below with reference to FIG. 7b. In step 850, the Fitness is compared to a predetermined threshold value hereafter called "Tolerance". The threshold value is selected in accordance with the positioning resolution which is required for a particular application. For example, if it is desired to position the object with a resolution of 3 mm and 0.5 degrees, the threshold value for Tolerance is typically $10^{-5}$. Typically, in the first iteration, none of the coordinate possibilities in the initial population pass the threshold value. If none of the members of the current population pass the threshold, then step 870 is performed and the method then returns to step 880. If at least one member of the current population pass the threshold, then that member is announced (step 880) as the best solution, i.e. as the position of the sensor 40. If more than one member passes the threshold, the member having the smallest Fitness value is announced as the best solution.

In step 870, a new generation is formed. As described in detail in FIG. 7c, the new generation is typically formed by generating a subset of the current population and applying mutations, crossovers and reproductions (duplications) to that subset or new population.

The subset of the current population typically includes a predetermined number of population members (coordinate possibilities) having the lowest Fitness values. The larger the subset, the less iterations are required to obtain a solution.

For example, if the current population is simply the initial population (i.e. if the first iteration is being performed) and if it is desired to filter out 90% of the current population, and if the initial population included 100 members, then the new population is simply the 10 members of the initial population having the lowest Fitness values.

Figure 7B:
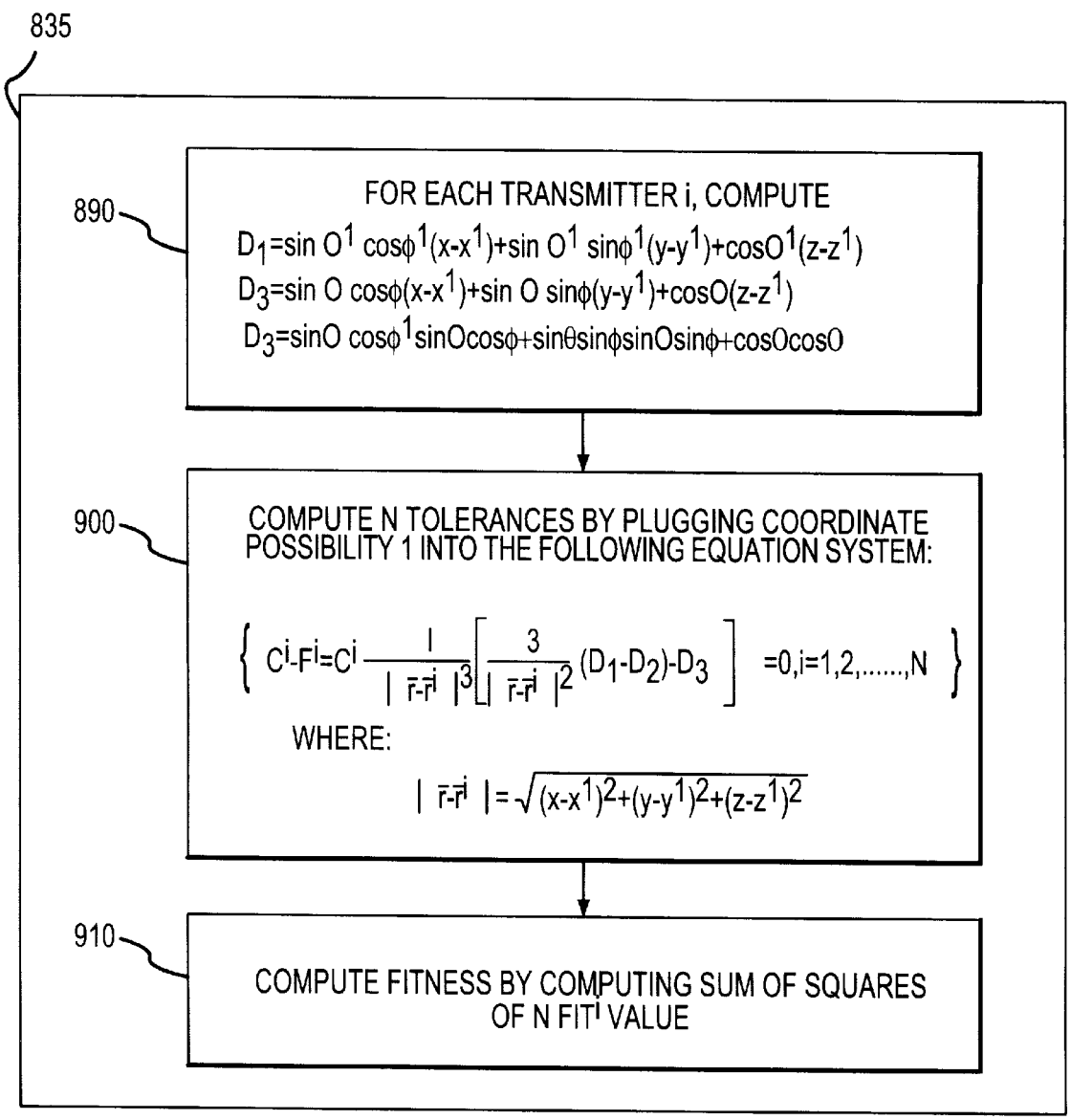

Reference is now made to FIG. 7b which is a simplified flowchart illustration of a preferred method for implementing step 835 for an individual coordinate possibility 1.

In steps 890 and 900, each member of the population (each sextuplet (x, y, z, θ, φ) including quadrant) is plugged into each of the N≧6 equations in the equation system of step 900, generating L systems of N equations. Typically, the N expressions on the left side of the N equations, respectively, are not equal to zero (unless the sextuplet is in fact a solution of the equation). The absolute value of the result of plugging in the sextuplet into each of the six expressions is termed the "partial fitness" (hereafter $Fit^i$) of that equation for that sextuplet.

In step 910, the N≧6 values of each of the $Fit^i$ calculated for each coordinate possibility 1 in the initial L-sized population are combined into a single value. Typically, $Fit^i$ are combined by computing the sum of squares of the N values of each of the $Fit^i$ parameters calculated for each coordinate possibility 1 in the initial population. This sum of squares is termed herein the "Fitness$_1$" of an individual coordinate possibility 1.

Figure 7C:
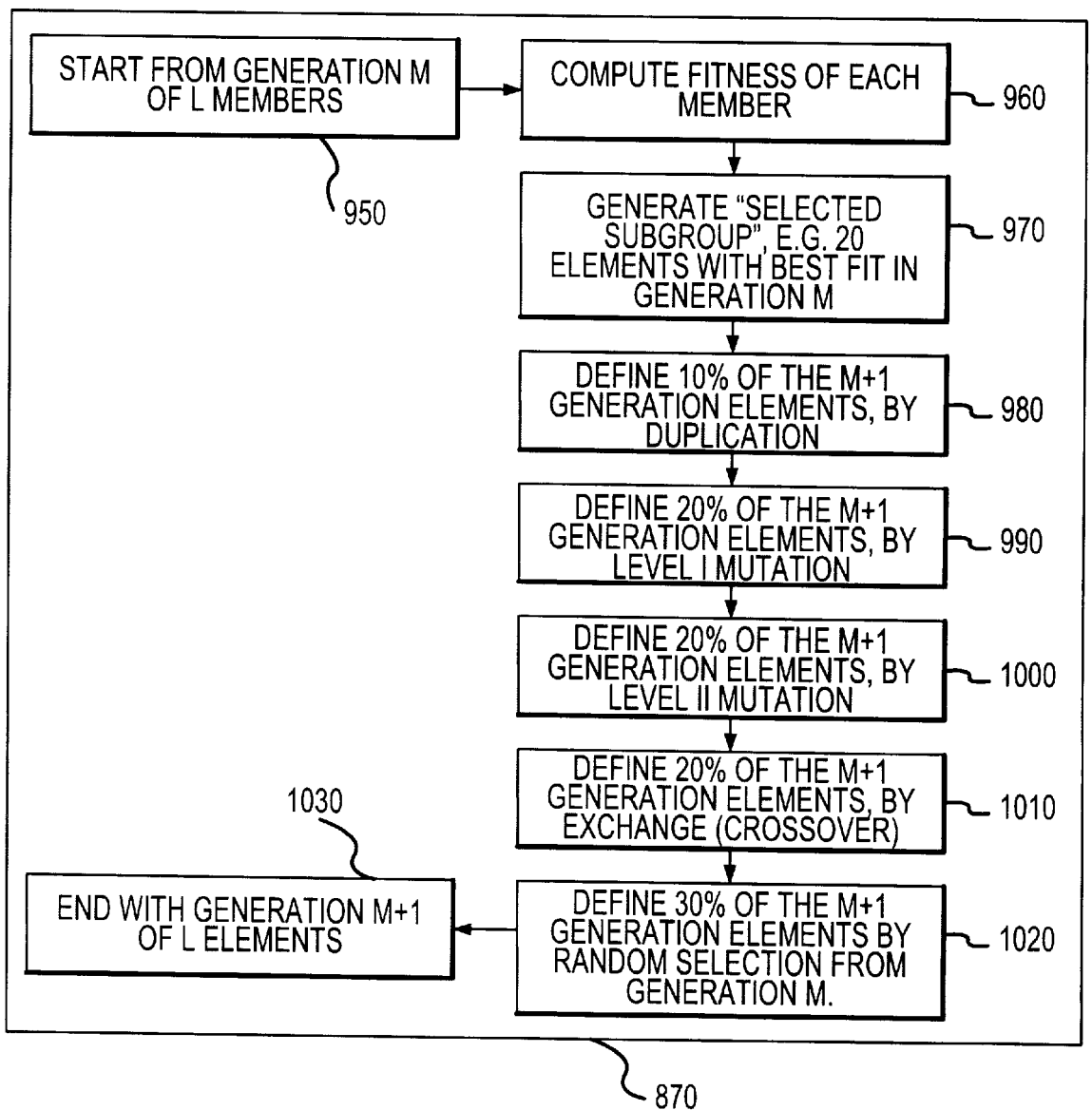

Reference is now made to FIG. 7c which is a simplified flowchart illustration of a preferred method for performing step 870 of FIG. 7a. The method of FIG. 7c uses genetic processes such as mutation, crossover and duplication on a pre-selected group of members in the present generation in order to generate a "new generation" which better fits the required optimal solution to the problem.

The starting point (step 950) is a generation number m that includes L members, for instance, 100 members (i.e. points, where each point includes a spatial triplet of x, y and z and orientation angles θ and φ). The size L of the total population in each generation can be set by the user (or automatically by the system) according to some pre-defined criterions as described herein below. In this case the $Fit^i$ is defined according to:

$$Fit^i = C^i - F^i \quad (31)$$

$$\text{Fitness} = \frac{2}{N} \sum_{i=1}^{N} \frac{|F^i - C^i|}{|F^i| + |C^i| + T} \quad i = 1 \ldots N \quad (32)$$

where $F^i$ is defined as the right side of equation (16):

$$F^i \equiv \frac{1}{|\vec{r} - \vec{r}^i|^3} \left[ \frac{3}{|\vec{r} - \vec{r}^i|^2} (D_1 \cdot D_2) - D_3 \right], \quad i = 1, 2, \ldots, N \quad (33)$$

and $$T = \sqrt{N^2_{sys} - \text{Tolerance}^2} \quad (34)$$

where Ci and Fi are as referred also in FIG. 7b, step 900.

N$_{sys}$ is the system noise, defined as the lowest level of signal that is detected by the detector 50 as a valid, i.e. non-noise signal in Volts [V].

Tolerance is a value, expressed in volts, which is selected to provide a required accuracy of computation. Empirically, the value of Tolerance is approximately $10^{-5}$ V if the accuracy of positioning required is approximately $10^{-3}$ meters.

The formula for Fitness scales the error and averages the fraction of the error relative to the desired results. To this end, a simple division by Ci would do. However, one has to treat the case where Ci is very close to zero, hence the term |Fi|+|Ci|. This term is zero, only when both Fi and Ci are close to zero. For this specific case the term T is added, and is assumed small. When Ci is fairly large, T's contribution is negligible. When Ci becomes small T takes over. In this case we would like to scale the error with the typical measurement error. Thus. For example, for a system with 0.01 mV typical system noise, and 1 mV desired tolerance, T becomes~1 mV. When Ci is closer to 1 V the contribution of T is small, and the normalized error is given by 2|Fi-Ci|/ (|Fi|+|Ci|). When $C^i$ is much less than 1 mV, and $F^i$ approaches $C^i$ then $Fit^i$ is as follows:

$$Fit^i = 2(Fi-Ci)/(|Fi|+|Ci|+T) \sim 2(Fi-Ci)/T = 2(Fi-Ci)/(1mV) \quad (35)$$

and $F^i - C^i$ must reach 0.025 mV to get a $Fit^i$ of 0.05.

In summary, the Fitness is found for all members of generation m. Here Fitness is defined as the criterion for how "good" is a specific point, as a potential solution to the problem, when compared to all other points (the lower Fitness, the better).

In step 970, the method finds the v members with the lowest fitness measure (the selected subgroup).

Based on the selected subgroup, and the actual numbers given above for illustration purposes, generate the L members of generation m+1 as follows:

Duplication: In step 980, the method duplicates the "best" member of the m'th generation (typically the member with the lowest Fitness) to obtain s percent, for instance 10%, of the (m+1)'th generation.

Mutation level I: In step 990, the method defines a radius r1 and randomly choose new members to constitute t percent of the new (m+1)'th generation, where t % may, for example, comprise 20%, i.e. 20 members if L=100. The new members selected in this step are randomly selected in the vicinity of the "best" (lowest Fitness value) u members. For example, if u=10, i.e. there are 10 members in the selected subgroup, then 20/10=2 new members are selected randomly within the vicinity of each of the u members in the selected subgroup. A preferred definition for r1 is as follows:

$$r1 = \max(\text{delta\_range\_}x, \text{delta\_range\_}y, \text{delta\_range\_}z)/B1 \quad (36)$$

B1 may, for example be 10. B is an expression of the degree of confidence which it is desired to ascribe to the members of the current population. The smaller the value of B, the closer the members of the next generation tend to be to the members of the present generation.

delta_range_x, delta_range_y, delta_range_z are the dimensions of the range in which the object whose position is being measured is assumed to reside. For example, if the object is known to reside within an area whose x-dimension ranges from 4 length units to 9 length units then delta_range_x is 5.

Mutation level II: In step 1000, a radius r2 is defined and the method randomly chooses new v percents, for instance 20%, of the m+1 generation, in the vicinity of each of the "best" w members, for instance 10 members of the selected subgroup.

Here r2 is defined as follows:

$$r2 = \max(\text{delta\_range\_}x, \text{delta\_range\_}y, \text{delta\_range\_}z)/B2 \quad (37)$$

where B2<B1 and may, for example, be 20.

Alternatively, only one level of mutation may be employed. In this case, in the above example, 40% of the members of the m+1 generation may be selected in an r1 vicinity of the members of the selected subgroup of generation m. Alternatively, more than two levels of mutation may be employed.

Cross Over: In step 1010, the method randomly selects a set of, say, 5 members (termed herein A, B, C, D and E for clarity) from the selected subgroup and randomly exchange (cross over) their x, y and z properties and their θ and φ properties to obtain e percents, for instance 20%, of the m+1 generation. For example, the first member within the 20% of the new generation may receive the x value of A, the y value of C, the z value of A, the θ value of E and the φ value of A. The second member within the 20% of the new generation may receive the x value of B, the y value of C, the z value of D, the θ value of D and the φ value of A, and so on until 20 new members are formed, assuming that L=100.

In step 1020, the method generates randomly p members, for instance 30 members, that typically represent q percents, for instance 30%, of the (m+1)'th generation.

This completes the creation of the m+1 generation.

It is appreciated that the percentages of new generation members selected using each of the generation creation options (random selection, duplication, high level mutation, low level mutation, crossover), need not have the above values (30%, 10%, 20%, 20% and 20%) although of course they must sum to 100%. The values of some of the percentages may even be 0% which means that one or more of the generation creation options are not used at all.

The value of the Tolerance parameter may be chosen empirically to give a desired accuracy in meters for measurement of the position of an object. For example, the system may be calibrated for a measurement session by placing the object in a known location and varying the Tolerance value until a position reading of the desired accuracy is obtained. Typically, a Tolerance value of approximately $10^{-5}$ V yields position readings having an accuracy in the range of 1 mm.

The Tolerance value may alternatively or in addition be adjusted in real time during a session. For example, if information regarding maximum velocity and/or acceleration is available then, if adjacent readings are too far apart, considering their time separation and the expected velocity and acceleration then the Tolerance value may be decreased to increase accuracy.

The size L of each generation is preferably determined automatically by the system as a function of the ratio between the desired accuracy and the length of the largest dimension of the range within which the object of interest is known to reside. For example, L may be determined by the following LUT (look up table):

| Ratio | L |
| --- | --- |
| 1–9.999 | 100 |
| 10–99.999 | 500 |
| 100 and above | 2200 |

Alternatively any other suitable criterion may be employed such as the ratio between volume of the range and desired accuracy.

Appendix A is a Matlab computer code listing of a preferred software implementation of a simulation of the digital signal processing unit of FIG. 8. The listing of Appendix A runs in the Matlab environment, where Matlab is a product of The MathsWorks, Inc., 24 Prime Park Way, Natick, Mass. 01760-1500, USA. To operate the software embodiment of Appendix A, type "GA" at the Matlab prompt.

It is appreciated that the present invention is useful for monitoring the position of substantially any type of moving object or figure including but not limited to the following applications: virtual reality, provision of on-line feedback during invasive medical procedures, remote control of moving objects such as vehicles, robotics, and any application that may need a Man-Machine-Interface accessories such as simulators. Therefore, the virtual reality application illustrated in FIG. 1b is not intended to be limiting.

It is appreciated that the software components of the present invention may, if desired, be implemented in ROM (read-only memory) form. The software components may, generally, be implemented in hardware, if desired, using conventional techniques.

It is appreciated that the particular embodiment described in the Appendices is intended only to provide an extremely detailed disclosure of the present invention and is not intended to be limiting.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow:

What is claimed is:

1. A system for monitoring of the position of at least one portion of an object, the system comprising:
    a plurality of transmitters operative to transmit alternating magnetic fields within a three-dimensional space; and
    at least one positioning sensor arranged to be fixed to at least one corresponding portion of the object whose positioning it is sought to monitor, each said positioning sensor comprising:

a magnetic field receiver having at least one active axis and operative to receive at least one component, lying along the at least one active axis respectively, of the alternating magnetic fields; and at least one digital signal processor for storing at least one characteristic of the magnetic fields as transmitted by the plurality of transmitters and comparing said at least one characteristic to at least one characteristics of the magnetic fields as received by a corresponding positioning sensor and, accordingly, determining and providing an output indication of at least one position characteristic of at least one corresponding portion of the object, wherein said at least one sensor comprises a plurality of sensors arranged to be fixed to a corresponding plurality of portions of the object whose positions it is sought to monitor.

2. A system according to claim 1 wherein said at least one sensor comprises a single sensor arranged to be fixed to a single portion of the object whose position it is sought to monitor.

3. A system according to claim 1 wherein said at least one position characteristic comprises at least one dimension of the spatial position of the object portion.

4. A system according to claim 1 wherein said at least one position characteristic comprises at least one dimension of the angular position of the object portion.

5. A system according to claim 1 wherein the magnetic field receiver has a single (detection) active axis and is operative to receive the component of the alternating magnetic fields lying along the single (detection) active axis.

6. A system according to claim 1 wherein the plurality of transmitters are operative to continuously transmit said alternating magnetic fields.

7. A system according to claim 1 wherein at least one sensor comprises a solid-state component.

8. A system according to claim 1 wherein at least one sensor comprises a control loop to improve the dynamic range of the signal intensity without the use of electronic components common in the art.

9. A system according to claim 1 wherein at least one sensor comprises a PLL configuration whose input is relatively insensitive to its input amplitude.

10. A system according to claim 9 wherein the bandwidth of the PLL apparatus does not substantially depend on the input amplitude of the PLL apparatus.

11. A system according to claim 9 wherein at least one dynamic property of the PLL apparatus does not substantially depend on the input amplitude of the PLL apparatus.

12. A system according to claim 9 wherein the relaxation time constant of the PLL apparatus does not substantially depend on the input amplitude of the PLL apparatus.

13. A system for monitoring the position of at least one portion of an object in three-dimensional space having three axes, the system comprising:

at least six magnetic transmitters each having a center and each operative to transmit alternating magnetic fields within a three-dimensional space;

a transmitter orientation maintainer operative to maintain at least three of the transmitters in orientation such that at least a component of the magnetic field of at least one of the transmitters falls within each of the 3 axes of the 3-dimensional space, and wherein less than all of the centers of the transmitters coincide;

at least one positioning sensor arranged to be fixed to at least one corresponding portion of the object whose positions it is sought to monitor, each positioning sensor comprising a magnetic field receiver receiving said alternative magnetic fields from the at least six transmitters; and at least one digital signal processor for storing at least one characteristic of the magnetic fields as transmitted by the plurality of at least six transmitters and comprising said at least one characteristic to at least one characteristic of the magnetic fields as received by a corresponding positioning sensor and, accordingly, determining at least one position characteristic of at least one object portion, wherein at least one sensor comprises a control loop to improve the dynamic range of the signal intensity.

14. A system according to claim 13 wherein said at least one digital signal processor is provided integrally within a corresponding one of said at least one positioning sensors.

15. A system according to claim 13 wherein at least 3 of the transmitters are separate physical units such that the at least three transmitters can be positioned at any 3 user-selected locations.

16. A system according to claim 13 wherein at least one sensor comprises a solid-state component.

17. A system according to claim 13 wherein at least one sensor comprises a PLL configuration whose output is relatively insensitive to its input amplitude.

18. A system according to claim 17 wherein at least one dynamic property of the PLL apparatus does not substantially depend on the input amplitude of the PLL apparatus.

19. A system according to claim 17 wherein the bandwidth of the PLL apparatus does not substantially depend on the input amplitude of the PLL apparatus.

20. A system according to claim 17 wherein the relaxation time constant of the PLL apparatus does not substantially depend on the input amplitude of the PLL apparatus.

21. A system for monitoring the position of at least one portion of an object in three-dimensional space having three axes, the system comprising:

at least six magnetic transmitters each having an active axial direction and each operative to transmit alternating magnetic fields within a three-dimensional space;

a transmitter orientation maintainer operative to maintain at least three of the transmitters in orientations such that at least a component of the magnetic field of at least one of the transmitters falls within each of the 3 axes of the 3-dimensional space, and wherein less than all of the transmitters' active axial directions are mutually orthogonal;

at least one positioning sensor arranged to be fixed to at least one corresponding portion of the object whose positions it is sought to monitor, each positioning sensor comprising a magnetic field receiver receiving said alternative magnetic fields from the at least six transmitters; and at least one digital signal processor for storing at least one characteristic of the magnetic fields as transmitted by the plurality of at least six transmitters and comparing said at least one characteristic to at least one characteristic of the magnetic fields as received by a corresponding positioning sensor and, accordingly, determining at least one position characteristic of at least one object portion, wherein at least first and second transmitters from among the at least six transmitters transmit in different frequencies.

22. A system according to claim 21 wherein at least first and second transmitters from among the at least six transmitters transmit in different phases.

23. A system according to claim 21 wherein at least one digital signal processor is operative to simultaneously process magnetic field characteristics arriving from more than one of the at least six transmitters.

24. A system according to claim 21 and also comprising an RF trigger which is operative to trigger all of the transmitters, thereby to synchronize the transmitters.

25. A system according to claim 24 wherein the RF trigger provides a timing signal to at lest one sensor.

26. A system according to claim 25 wherein at least one sensor computes the absolute phase of the at least six transmitters, based on said timing signal.

27. A system according to claim 21 wherein at least one sensor comprises a Linear Predicted Coding control loop operative to increase the dynamic range of incoming signals.

28. A system according to claim 21 wherein at least one sensor comprises a solid-state component.

29. A system according to claim 21 wherein at least one sensor comprises a control loop to improve the dynamic range of the signal intensity without the use of electronic components common in the art.

30. A system according to claim 21 wherein at least one sensor comprises a PLL configuration whose output is relatively insensitive to its input amplitude.

31. A system according to claim 30 wherein at least one dynamic property of the PLL apparatus does not substantially depend on the input amplitude of the PLL apparatus.

32. A system according to claim 30 wherein the bandwidth of the PLL apparatus does not substantially depend on the input amplitude of the PLL apparatus.

33. A system according to claim 30 wherein the relaxation time constant of the PLL apparatus does not substantially depend on the input amplitude of the PLL apparatus.

34. A system for monitoring the position of at least one portion of an object in three-dimensional space having three axes, the system comprising:

at least six magnetic transmitters each having an active axial direction and each operative to transmit alternating magnetic fields within a three-dimensional space;

a transmitter orientation maintainer operative to maintain at least three of the transmitters in orientations such that at least a component of the magnetic field of at least one of the transmitters falls within each of the 3 axes of the 3-dimensional space, and wherein less than all of the transmitters' active axial directions arm mutually orthogonal;

at least one positioning sensor arranged to be fixed to at least one corresponding portion of the object hose positions it is sought to monitor, each positioning sensor comprising a magnetic field receiver receiving said alternating magnetic fields from the at least six transmitters; and at least one digital signal processor for storing at least one characteristic of the magnetic fields as transmitted by the plurality of at least six transmitters and comparing said at least one characteristic to at least one characteristic of the magnetic fields as received by a corresponding positioning sensor and, accordingly, determining at least one position characteristic of at least one object portion;

wherein at least one digital signal processor is operative to simultaneously process magnetic field characteristics arriving from more than one of the at least six transmitters.

35. A system for monitoring the position of at least one portion of an object in three-dimensional space having three axes, the system comprising:

at least six magnetic transmitters each having an active axial direction and each operative to transmit alternating magnetic fields within a three-dimensional space;

a transmitter orientation maintainer operative to maintain at least three of the transmitters in orientations such that at least a component of the magnetic field of at least one of the transmitters falls within each of the 3 axes of the 3-dimensional space, and wherein less than all of the transmitters' active axial directions are mutually orthogonal;

at least one positioning sensor arranged to be fixed to at least one corresponding portion of the object whose positions it is sought to monitor, each positioning sensor comprising a magnetic field receiver receiving said alternating magnetic fields from the at least six transmitters; and at least one digital signal processor for storing at least one characteristic of the magnetic fields as transmitted by the plurality of at least six transmitters and comprising said at least one characteristic to at least one characteristic of the magnetic fields as received by a corresponding positioning sensor and, accordingly, determining at least one position characteristic of at least one object portion, and also comprising an RF trigger which is operative to trigger all of the transmitters, thereby to synchronize the transmitters.

36. A system for monitoring the position of at least one portion of an object in three-dimensional space having three axes, the system comprising:

at least six magnetic transmitters each having an active axial direction and each operative to transmit alternating magnetic fields within a three-dimensional space;

a transmitter orientation maintainer operative to maintain at least three of the transmitters in orientations such that at least a component of the magnetic field of at least one of the transmitters falls within each of the 3 axes of the 3-dimensional space, and wherein less than all of the transmitters' active axial directions are mutually orthogonal;

at least one positioning sensor arranged to be fixed to at least one corresponding portion of the object whose positions it is sought to monitor, each positioning sensor comprising a magnetic field receiver receiving said alternative magnetic fields from the at least six transmitters; and;

at least one digital signal processor for storing at least one characteristic of the magnetic fields as transmitted by the plurality of at least six transmitters and comprising said tat least one characteristic to at least one characteristic of the magnetic fields as received by a corresponding positioning sensor and, accordingly, determining at least one position characteristic of at lest one object portion.

wherein at least one sensor comprises a Linear Predicted coding control loop operative to increase the dynamic range of incoming signals.

\* \* \* \* \*